US010983686B2

(12) United States Patent
Watanabe et al.

(10) Patent No.: US 10,983,686 B2
(45) Date of Patent: Apr. 20, 2021

(54) DISPLAY CONTROL APPARATUS EQUIPPED WITH TOUCH PANEL, CONTROL METHOD THEREFOR, AND STORAGE MEDIUM STORING CONTROL PROGRAM THEREFOR

(71) Applicant: CANON KABUSHIKI KAISHA, Tokyo (JP)

(72) Inventors: Kazuhiro Watanabe, Tokyo (JP); Hideki Narushima, Fujisawa (JP); Kazuya Horikirikawa, Kawasaki (JP); Shingo Yamazaki, Tokyo (JP); Wataru Kaku, Yokohama (JP); Soushi Takita, Kawasaki (JP); Yuko Hokari, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/831,226

(22) Filed: Mar. 26, 2020

(65) Prior Publication Data

US 2020/0225823 A1 Jul. 16, 2020

Related U.S. Application Data

(62) Division of application No. 15/697,984, filed on Sep. 7, 2017, now Pat. No. 10,642,472.

(30) Foreign Application Priority Data

Sep. 9, 2016 (JP) .................................. 2016-176498
Sep. 9, 2016 (JP) .................................. 2016-176499

(51) Int. Cl.
*G06F 3/0485* (2013.01)
*G06F 3/0488* (2013.01)
*G06F 3/0484* (2013.01)

(52) U.S. Cl.
CPC .......... *G06F 3/0485* (2013.01); *G06F 3/0488* (2013.01); *G06F 3/04842* (2013.01); *G06F 3/04883* (2013.01)

(58) Field of Classification Search
CPC .......................................... G06F 3/048–04897
See application file for complete search history.

(56) References Cited

U.S. PATENT DOCUMENTS 8,578,271 B2 11/2013 Laugwitz et al.
8,775,952 B2 7/2014 Laugwitz et al.
(Continued)

FOREIGN PATENT DOCUMENTS

CN 102597944 A 7/2012
CN 103493000 A 1/2014
(Continued)

OTHER PUBLICATIONS

The above foreign patent document was cited in the Jun. 30, 2020 Japanese Office Action, which is inclosed without an English Translation, that issued in Japanese Patent Application No. 2016176498.
(Continued)

*Primary Examiner* — Gene W Lee
(74) *Attorney, Agent, or Firm* — Cowan, Liebowitz & Latman, P.C.

(57) ABSTRACT

A display control apparatus that is capable of making a user feel a fact that a user's operation is received and of notifying the user that an end of a scrolling range has come. A display unit displays a displaying object. An operation detection unit detects a user's operation to the display unit. A display control unit scrolls the displaying object when the operation detection unit detects an instructing operation of scrolling, and displays a shadow of the displaying object and moves the shadow in a direction opposite to a direction of scrolling by the instructing operation when the instructing operation
(Continued)

is not completed even if the displaying object has been scrolled to an end of a scrolling range.

24 Claims, 13 Drawing Sheets

(56) References Cited

U.S. PATENT DOCUMENTS

| | | | |
|---|---|---|---|
| 9,035,967 B2 * | 5/2015 | Jakab | ................ G09G 5/34 |
| | | | 345/619 |
| 9,329,764 B2 | 5/2016 | Kuuscher et al. | |
| 9,569,088 B2 * | 2/2017 | Kwak | ................ G06F 3/0485 |
| 10,235,035 B2 | 3/2019 | Karunamuni et al. | |
| 10,474,344 B2 | 11/2019 | Lee et al. | |
| 2011/0090255 A1 | 4/2011 | Wilson et al. | |
| 2012/0026181 A1 | 2/2012 | Wagner et al. | |
| 2012/0066627 A1 | 3/2012 | Furukawa et al. | |
| 2012/0120109 A1 | 5/2012 | Lee | |
| 2014/0002502 A1 | 1/2014 | Han | |
| 2014/0132536 A1 * | 5/2014 | Ikenaga | ................ G06F 3/1423 |
| | | | 345/173 |
| 2015/0046869 A1 | 2/2015 | Nabeshima | |
| 2015/0058793 A1 | 2/2015 | Lee et al. | |
| 2017/0046039 A1 | 2/2017 | Karunamuni et al. | |

FOREIGN PATENT DOCUMENTS

| | | |
|---|---|---|
| CN | 105278773 A | 1/2016 |
| JP | 2007-043247 A | 2/2007 |
| JP | 2012-063862 A | 3/2012 |
| JP | 2012063860 A | 3/2012 |

OTHER PUBLICATIONS

The above foreign patent document was cited in the Jul. 7, 2020 Japanese Office Action, which is enclosed without an English Translation, that issued in Japanese Patent Application No. 2016176499. The above documents were cited in a Dec. 2, 2020 Chinese Office Action, a copy of which is enclosed with an English Translation, that issued in Chinese Patent Application No. 201710795350.5.

\* cited by examiner

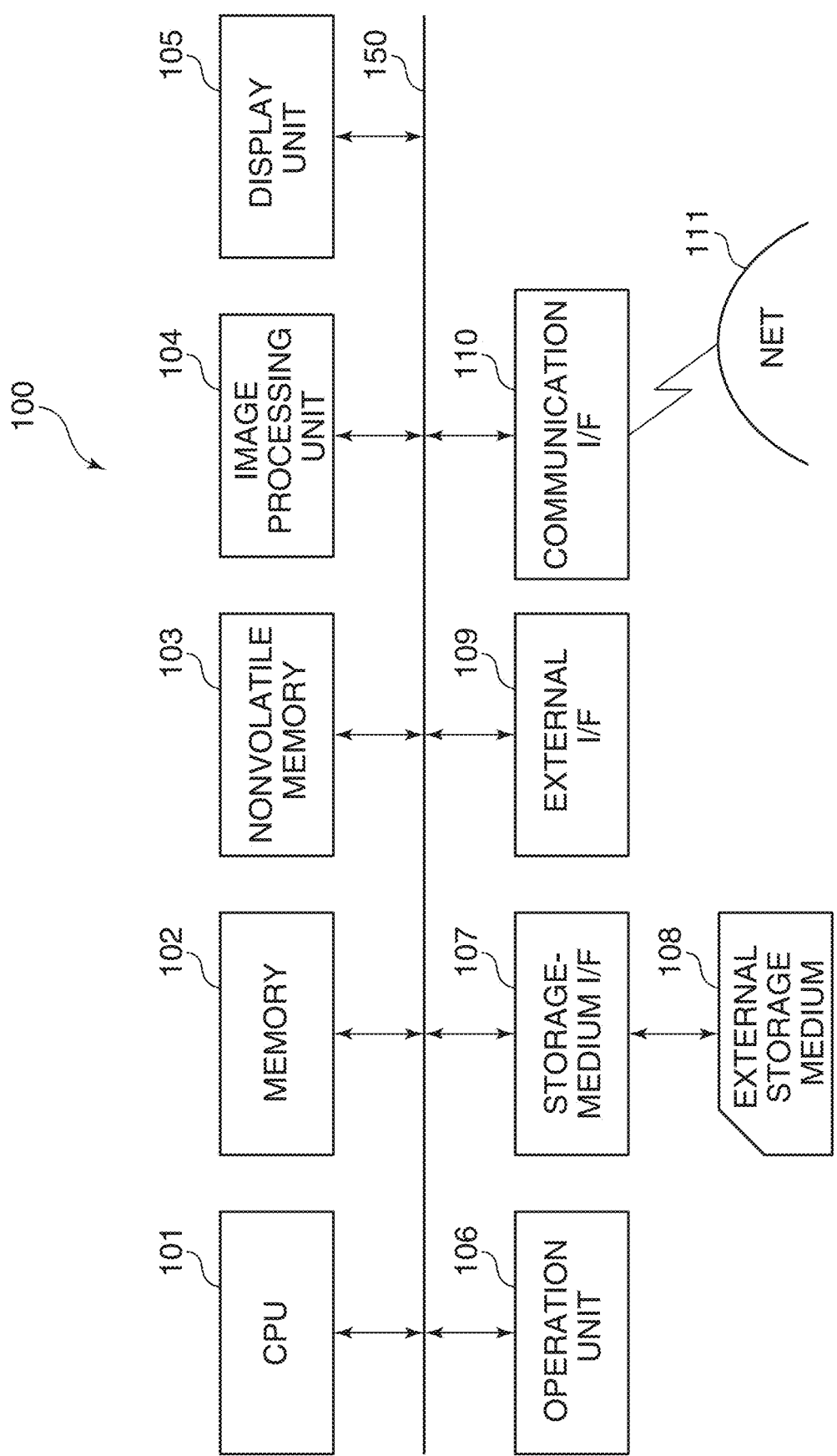

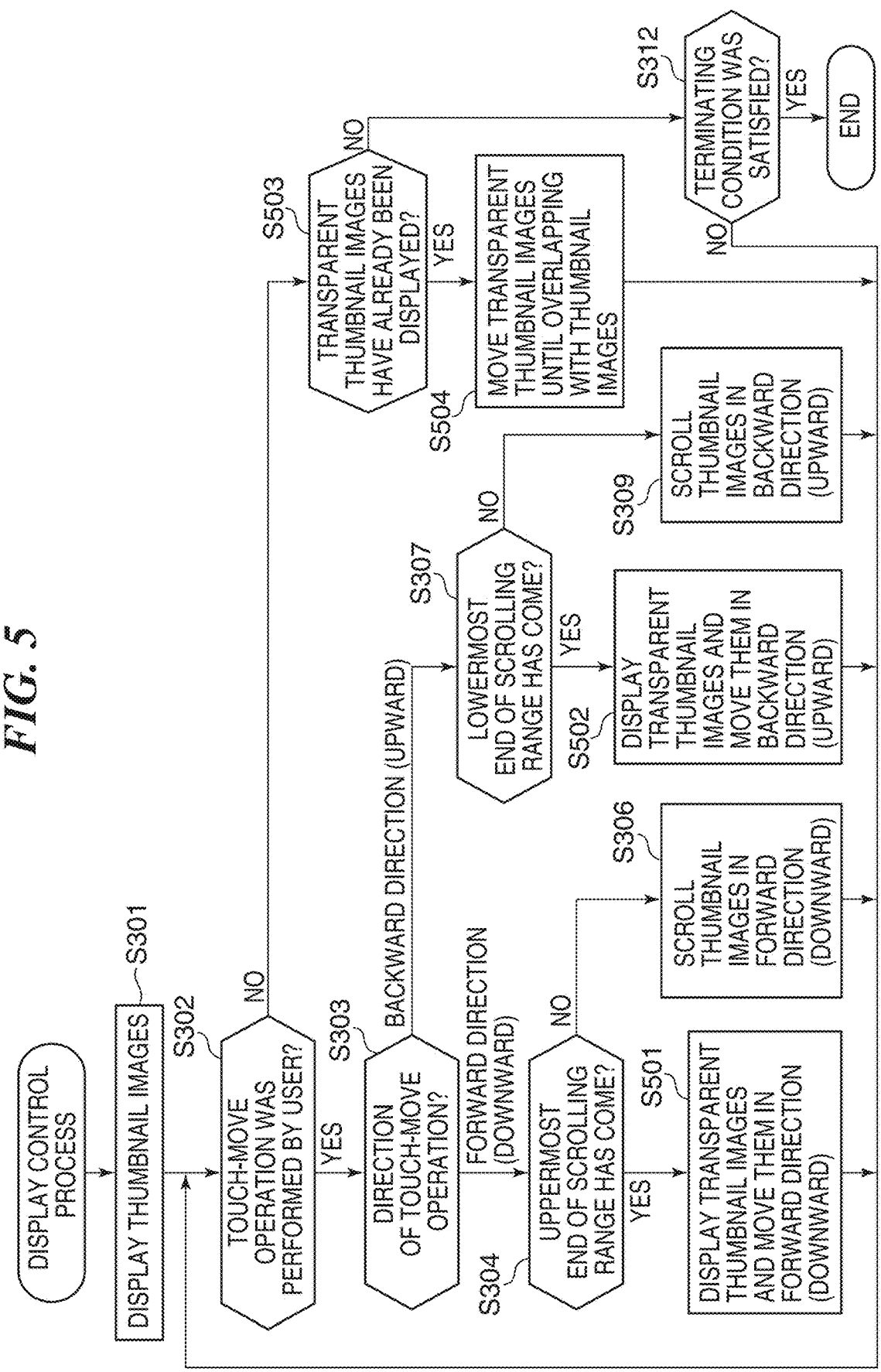

DISPLAY CONTROL APPARATUS EQUIPPED WITH TOUCH PANEL, CONTROL METHOD THEREFOR, AND STORAGE MEDIUM STORING CONTROL PROGRAM THEREFOR

CROSS-REFERENCE TO RELATED APPLICATION

This application is a divisional of application Ser. No. 15/697,984, filed Sep. 7, 2017, the entire disclosure of which is hereby incorporated by reference.

BACKGROUND OF THE INVENTION

Field of the Invention

The present invention relates to a display control apparatus, a control method, and a storage medium storing a control program, and in particular, relates to a technique of what is called a graphical user interface (GUI) using a touch panel.

Description of the Related Art

In general, digital apparatuses in recent years have a GUI that displays various functions etc. so as to be operatable by a user. Such digital apparatuses are provided with a touch panel that detects a user's touch operation to a display unit. Then, when a user operates by touching an icon, an image, or a document (hereinafter referred to as a "displaying object" or a "graphic") displayed on the display unit, a process corresponding to the touch operation concerned is performed.

Incidentally, there may be hidden graphics that continue to a graphic displayed on the display unit but is not displayed on the display unit. In such a case, the graphics are scrolled in response to a Touch-Move operation by a user so that the hidden graphics continued in a direction opposite to the scrolling are sequentially scrolled and displayed.

As a result of the scrolling, when the hidden graphics are displayed to the end (when the end of a scrolling range has come), the graphics do not scroll even if a Touch-Move operation by the user is performed.

On the other hand, when a user's operation is not received, the graphics do not scroll in a similar manner. Accordingly, when the graphics do not scroll, the user cannot determine whether the end of the scrolling range has come or the operation is not receivable. Accordingly, since there is no suitable response to an operation, the user feels an operational stress and usability is lowered.

In order to solve such a problem, there is a known method of controlling so as to scroll displaying objects with a display effect corresponding to a scrolling instruction (See United States Patent Application Publication No. 20150046869A1). In this method, for example, when a user performs a Touch-Move operation downwardly on a display unit, the displaying objects scroll downwardly. In this case, the displaying objects are displayed with a tilt by changing a perspective (angle of a perspective view) so that a side in a traveling direction of the scrolling is seen in front.

Furthermore, there is a known method that facilitates recognition of an image transition direction by displaying horizontal lines with different arrangement density corresponding to a scrolling direction (see Japanese Laid-Open Patent Publication (Kokai) No. 2007-43247 (JP 2007-43247A)).

According to the methods in the above-mentioned two publications, when the scrolling stops because the end of the scrolling range has come, the fact that the user's operation is received becomes clear to some extent. That is, the user knows that the user's operation is received through the tilt of the displaying objects or the display of the horizontal lines.

However, when the graphics that were scrolled until now stop immediately, the displaying state changes rapidly as compared with the previous state. Accordingly, a response to the user is not suitable and usability is still lowered.

SUMMARY OF THE INVENTION

The present invention provides a display control apparatus, a control method therefor, and a storage medium storing a control program therefor, which are capable of making a user feel a fact that a user's operation is received and of notifying the user that an end of a scrolling range has come.

Accordingly, a first aspect of the present invention provides a display control apparatus including a display unit configured to display a displaying object, an operation detection unit configured to detect a user's operation to the display unit, and a display control unit configured to scroll the displaying object in a case where the operation detection unit detects an instructing operation of scrolling, and to display a shadow of the displaying object and to move the shadow in a direction opposite to a direction of scrolling by the instructing operation in a case where the instructing operation is not completed even if the displaying object has been scrolled to an end of a scrolling range.

Accordingly, a second aspect of the present invention provides a display control apparatus including a display unit configured to display a displaying object, an operation detection unit configured to detect a user's operation to the display unit, and a display control unit configured to scroll the displaying object in a case where the operation detection unit detects an instructing operation of scrolling, to display a transparent displaying object that is obtained by converting the displaying object into a transmission state so as to be superimposed on the displaying object and to move the transparent displaying object in a direction identical to a direction of scrolling by the instructing operation in a case where the instructing operation is not completed even if the displaying object has been scrolled to an end of a scrolling range.

Accordingly, a third aspect of the present invention provides a control method for a display control apparatus that displays a displaying object on a display unit, the control method including a detection step of detecting a user's operation to the display unit, a first control step of scrolling the displaying object in a case where an instructing operation of scrolling is detected in the detection step, and a second control step of displaying a shadow of the displaying object and of moving the shadow in a direction opposite to a direction of scrolling by the instructing operation in a case where the instructing operation is not completed even if the displaying object has been scrolled to an end of a scrolling range.

Accordingly, a fourth aspect of the present invention provides a control method for a display control apparatus that displays a displaying object on a display unit, the control method including a detection step of detecting a user's operation to the display unit, a first control step of scrolling the displaying object in a case where an instructing operation of scrolling is detected in the detection step, and a second control step of displaying a transparent displaying object that is obtained by converting the displaying object into a transmission state so as to be superimposed on the displaying object and of moving the transparent displaying object in a direction identical to a direction of scrolling by the instructing operation in a case where the instructing operation is not completed even if the displaying object has been scrolled to an end of a scrolling range.

Accordingly, a fifth aspect of the present invention provides a non-transitory computer-readable storage medium storing a control program causing a computer to execute the control method of the third aspect.

Accordingly, a sixth aspect of the present invention provides a non-transitory computer-readable storage medium storing a control program causing a computer to execute the control method of the fourth aspect.

Accordingly, a seventh aspect of the present invention provides a display control apparatus including a display unit configured to display a displaying object, an operation detection unit configured to detect a user's operation to the display unit, and a display control unit configured to scroll the displaying object in a case where the operation detection unit detects an instructing operation of scrolling, to display a displaying item that imitates a ripple so as to be superimposed on the displaying object and to move the displaying item in a direction identical to a direction of scrolling by the instructing operation in a case where the instructing operation is not completed even if the displaying object has been scrolled to an end of a scrolling range.

Accordingly, an eighth aspect of the present invention provides a display control apparatus including a display unit configured to display a displaying object, an operation detection unit configured to detect a user's operation to the display unit, and a display control unit configured to scroll the displaying object in a case where the operation detection unit detects an instructing operation of scrolling, and to display a distorted object that is obtained by distorting at least a part of the displaying object in a direction of scrolling according to a point at which the instructing operation is given on the display unit in a case where the instructing operation is not completed even if the displaying object has been scrolled to an end of a scrolling range.

Accordingly, a ninth aspect of the present invention provides a control method for a display control apparatus that displays a displaying object on a display unit, the control method including a detection step of detecting a user's operation to the display unit, a first control step of scrolling the displaying object in a case where an instructing operation of scrolling is detected in the detection step, and a second control step of displaying a displaying item that imitates a ripple so as to be superimposed on the displaying object and of moving the displaying item in a direction identical to a direction of scrolling by the instructing operation in a case where the instructing operation is not completed even if the displaying object has been scrolled to an end of a scrolling range.

Accordingly, a tenth aspect of the present invention provides a control method for a display control apparatus that displays a displaying object on a display unit, the control method including a detection step of detecting a user's operation to the display unit, a first control step of scrolling the displaying object in a case where an instructing operation of scrolling is detected in the detection step, and a second control step of displaying a distorted object that is obtained by distorting at least a part of the displaying object in a direction of scrolling according to a point at which the instructing operation is given on the display unit in a case where the instructing operation is not completed even if the displaying object has been scrolled to an end of a scrolling range.

Accordingly, an eleventh aspect of the present invention provides a non-transitory computer-readable storage medium storing a control program causing a computer to execute the control method of the ninth aspect.

Accordingly, a twelfth aspect of the present invention provides a non-transitory computer-readable storage medium storing a control program causing a computer to execute the control method of the tenth aspect.

The present invention is capable of making a user feel a fact that a user's operation is received and of notifying the user that an end of a scrolling range has come.

Further features of the present invention will become apparent from the following description of exemplary embodiments with reference to the attached drawings.

BRIEF DESCRIPTION OF THE DRAWINGS

FIG. 1 is a block diagram schematically showing a configuration of an electronic apparatus equipped with a display control apparatus according to a first embodiment of the present invention.

FIG. 5 is a flowchart for describing a display control process performed by the PC according to the second embodiment of the present invention.

DESCRIPTION OF THE EMBODIMENTS

Figure 2A:
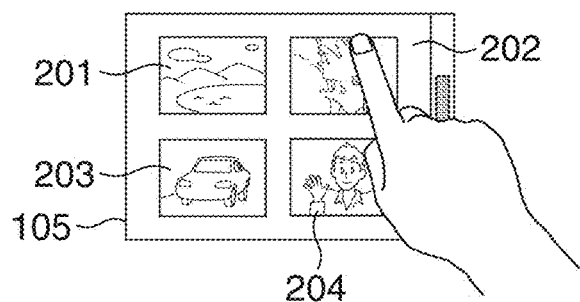
FIG. 2A through FIG. 2G are views for describing an example of transition of a screen displayed on a display unit shown in FIG. 1.

Hereafter, examples of display control apparatuses according to embodiments of the present invention will be described with reference to the attached drawings.

FIG. 1 is a block diagram schematically showing a configuration of an electronic apparatus equipped with a display control apparatus according to a first embodiment of the present invention. It should be noted that the illustrated electronic apparatus 100 is a personal computer (hereinafter referred to as a PC), for example.

The PC 100 has a CPU 101, a memory 102, a nonvolatile memory 103, an image processing unit 104, a display unit 105, an operation unit 106, a storage-medium I/F 107, an external I/F 109, and a communication I/F 110. Then, these blocks are mutually connected via an inner bus 150 so as to send and receive data mutually via the internal bus 150.

The memory 102 is a RAM, for example. The CPU 101 controls the PC 100 according to the programs stored in the nonvolatile memory 103, for example, while using the memory 102 as a work memory. The nonvolatile memory 103 stores image data, audio data, other data, and various programs that run on the CPU 101. The nonvolatile memory 103 consists of a hard disk (HD), a ROM, etc.

The image processing unit 104 applies a predetermined image process to image data recorded in the nonvolatile memory 103 or an external storage medium 108 under control of the CPU 101. Furthermore, the image processing unit 104 applies a predetermined image process to a video signal obtained through the external I/F 109 or image data obtained through the communication I/F 110. The image processing unit 104 applies image processes, such as an A/D conversion process, a D/A conversion process, an image data encoding process, a compression process, a decode process, an expansion/reduction process (resizing), a noise reduction process, and a color conversion process.

The image processing unit 104 may consist of a circuit block dedicated for a particular image process. Moreover, the CPU 101 may apply a certain image process according to a program without using the image processing unit 104.

The display unit 105 displays an image and a GUI (Graphical User Interface) screen according to the control of the CPU 101. The CPU 101 generates a display control signal according to a program. Moreover, the CPU 101 generates a video signal for displaying a video on the display unit 105 and outputs the video signal to the display unit 105.

The display unit 105 displays a video (an image) according to the video signal. It should be noted that an external monitor (television etc.) may be used as the display unit 105 when the PC 100 is not provided with the display unit 105.

The operation unit 106 includes a textual information input device such as a keyboard, a pointing device such as a mouse or a touch panel, a button, a dial, a joy stick, a touch sensor, and a touch pad. The operation unit 106 is an input device that receives a user's operation.

The touch panel is arranged so as to be overlapped on the display unit 105. The touch panel outputs coordinate information corresponding to a position (touch position) where the user touched, and functions as a touch detection unit. If the touch panel is included in the operation unit 106, the CPU 101 detects the operations performed to the touch panel or the state of the touch panel described below.

The operation of the user newly touching the touch panel with a pointer, such as finger or a stylus. In other words, the operation corresponding to the start of the touch (hereinafter referred to as "Touch-Down").

The state of the user touching the touch panel with the finger or the stylus (hereinafter referred to as "Touch-On").

The operation of the user moving the finger or the stylus on the touch panel while it is in contact with the panel (hereinafter referred to as "Touch-Move").

The operation of the user removing the finger or the stylus that is in contact with the touch panel from the touch panel. In other words, the operation corresponding to the end of the touch (hereinafter referred to as "Touch-Up").

The state of the user not touching the touch panel (hereinafter referred to as "Touch-Off").

If the CPU 101 detects the Touch-Down, the CPU 101 simultaneously detects the Touch-On. After the Touch-Down, the Touch-On state is continuously detected so long as the CPU 101 does not detect the Touch-Up.

The CPU 101 detects the Touch-Move while the Touch-On state is detected. Even if the Touch-On is detected, the CPU 101 does not detect the Touch-Move when the touch position does not move. When the CPU 101 determines that all the fingers or the stylus is removed from the touch panel (Touch-Up), the CPU 101 detects the state Touch-Off.

These operations, states, and the position coordinates of the finger or the stylus on the touch panel are sent to the CPU 101 via the internal bus 150. The CPU 101 determines the operation that has been performed to the touch panel on the basis of the information notified. When the Touch-Move operation is performed, the moving amount of the finger or the stylus on the touch panel is determined for each of vertical and horizontal components of the touch panel on the basis of the change in the position coordinate.

Moreover, when the Touch-Down, a certain amount of the Touch-Move, and the Touch-Up are performed, the CPU 101 determines that a stroke is drawn. An operation by drawing a stroke quickly is called a "flick". The flick is an operation that quickly moves the finger for a certain distance while touching to the touch panel and then removes the finger from the touch panel. In other words, the flick is an operation of quickly tracing the touch panel by the finger as flicking the touch panel. When detecting the Touch-Move of a predetermined distance or more at a predetermined speed or higher and also detecting the Touch-Up, the CPU 101 determines that the flick has been performed. When detecting the Touch-Move of the predetermined distance or more at a speed lower than the predetermined speed, the CPU 101 determines that a drag has been performed.

It should be noted that the touch panel may employ any methods, such as a resistance film method, a capacitive sensing method, a surface acoustic wave method, an infrared method, an electromagnetic induction method, an image recognition method, and a photosensor method.

The external storage medium 108, such as a memory card, a CD, and a DVD, is attachable to the storage-medium I/F 107. The storage-medium I/F 107 reads data from the external storage medium 108 and writes data into the external storage medium 108 under the control of the CPU 101. The external I/F 109 is an interface connected to an external device via a wired cable or a wireless means of communication. The external I/F 109 is used for inputting/outputting a video signal or an audio signal. The communication I/F 110 is an interface used for sending/receiving various types of data, such as a file and a command, by communicating with an external device or the Internet (NET) 111.

Figure 2B:
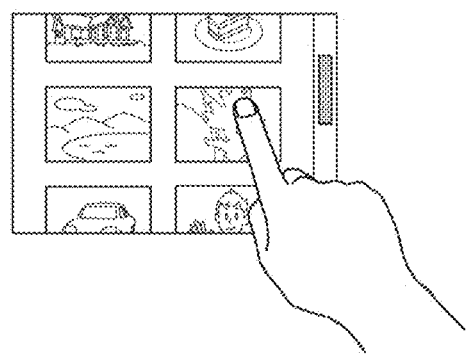
Figure 2C:
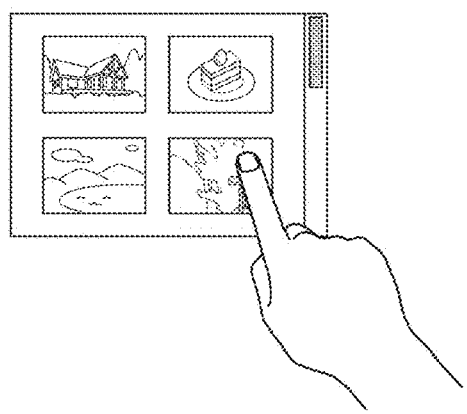
Figure 2D:
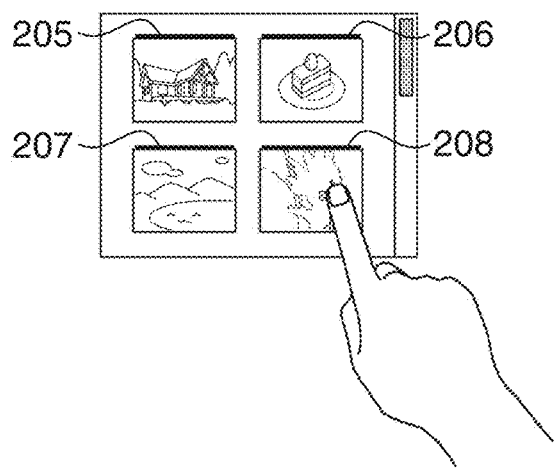
Figure 2E:
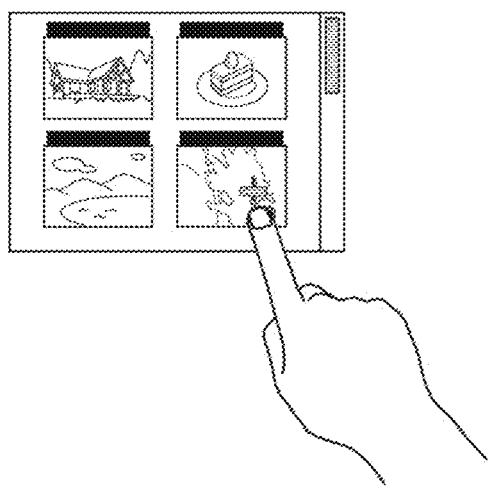
Figure 2F:
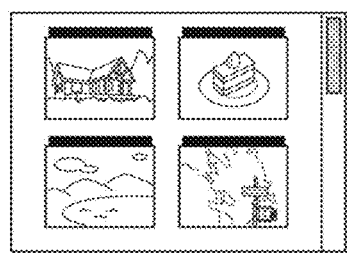
Figure 2G:
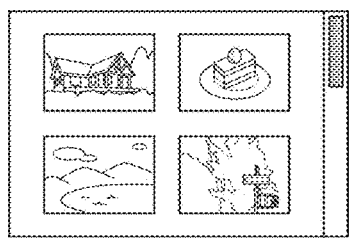

FIG. 2A through FIG. 2G are views for describing an example of transition of a screen displayed on the display unit of the PC according to the first embodiment of the present invention. FIG. 2A is a view showing a state where the Touch-Down operation has been performed, and FIG. 2B is a view showing a state where the Touch-Move operation has been performed downwardly. Moreover, FIG. 2C is a view showing a state where an end of a scrolling range (scrolling end) has come. FIG. 2D and FIG. 2E are views showing states where the downward Touch-Move operation continued after reaching the scroll end. Furthermore, FIG. 2F is a view showing a state of the Touch-Up after completing the Touch-Move operation, and FIG. 2G is a view showing the Touch-Off state where the thumbnail images are returned to the original positions.

The CPU 101 displays a plurality of thumbnail images (displaying object) on the display unit 105 as indices. The CPU 101 scrolls the plurality of thumbnail images upwardly or downwardly in response to the Touch-Move operation in the downward direction or the upward direction (an instructing operation of scrolling). When the scrolling end has come, the CPU 101 stops the scrolling of the plurality of thumbnail images. Then, when the Touch-Move operation continues in the same direction after reaching the scrolling end, the CPU 101 displays a shadow of each of the thumbnail images, and moves the shadow concerned in the direction opposite to the scrolling direction (i.e., in the upward direction or the downward direction).

It should be noted that the thumbnail images are arranged in order from the left end to the right end in the first row and then from the left end to the right end of the following row according to the file name, the image number, or a photographing date-and-time.

In FIG. 2A, thumbnail images 201 through 204 are displayed on the display unit 105. In the state shown in FIG. 2A, the thumbnail images 201 through 204 have not reached the scrolling end. The user shall perform the Touch-Down operation to the screen in this state.

FIG. 2B shows a state where the user performed the Touch-Move operation downwardly in the drawing. The CPU 101 scrolls the thumbnail images downwardly in response to the Touch-Move operation.

FIG. 2C shows a state where the Touch-Move operation is continuing downwardly and where the scrolling end has come. When the scrolling end has come, the CPU 101 stops the scrolling of the thumbnail images.

FIG. 2D and FIG. 2E show states where the Touch-Move operation is continuing downwardly after reaching the scrolling end. When the Touch-Move operation continues after reaching the scrolling end, the CPU 101 draws and displays shadows 205 through 208 on the respective thumbnail images (see FIG. 2D). Then, when the Touch-Move operation is further continued, the CPU 101 moves the shadows upwardly (see FIG. 2E). In this case, the CPU 101 adjusts the moving speed of the shadows according to the moving speed of the thumbnail images until now.

This gives the user an illusion as if the thumbnail images move in the same direction until now by moving the shadows of the thumbnail images in spite of the fact that the scrolling of the thumbnail image has stopped. This is the same as a state where a passenger has an illusion as if an outside landscape through a window moves in the opposite direction when a bus that stopped starts. Accordingly, the user clearly recognizes that the Touch-Move operation is received and that the scrolling of the thumbnail images stopped (i.e., the scrolling end has come).

As shown in FIG. 2F, when the Touch-Move operation completes and the Touch-Up is detected, the CPU 101 moves the shadows of the thumbnail images downwardly so as to return toward the positions of the original thumbnail images. When the Touch-Off state has come as shown in FIG. 2G, the CPU 101 returns the shadows to the positions of the original thumbnail images and stops displaying the shadows (i.e., the shadows disappear).

Figure 3:
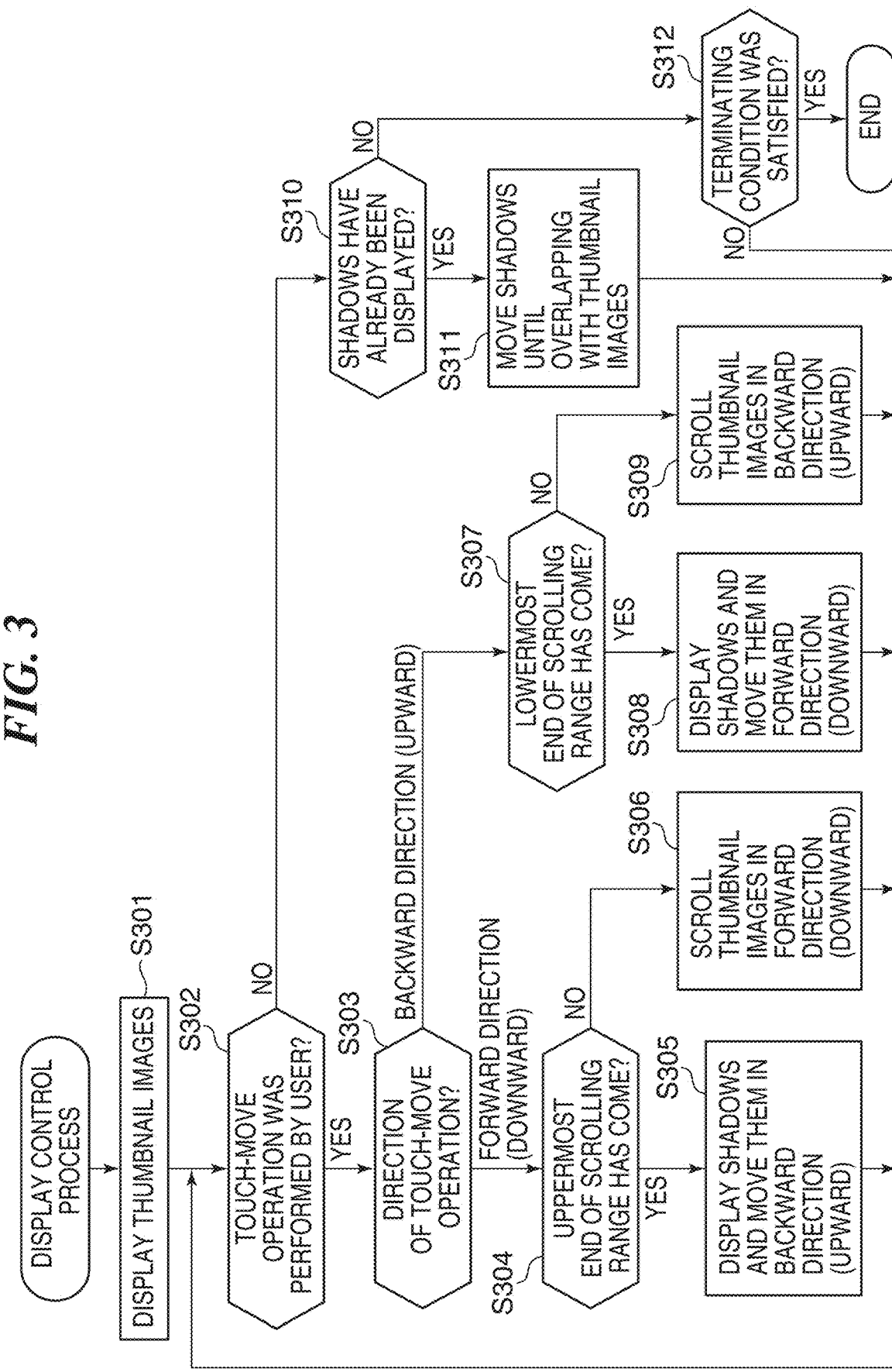
FIG. 3 is a flowchart for describing a display control process performed by a PC shown in FIG. 1.

FIG. 3 is a flowchart for describing a display control process performed by the PC shown in FIG. 1. It should be noted the process in the flowchart shown in FIG. 3 is performed when the CPU 101 develops and runs the program stored in the nonvolatile memory 103 to a work memory area in the memory 102.

When the display control process is started, the CPU 101 displays thumbnail images on the display unit 105 as indices (step S301). Then, the CPU 101 determines whether the Touch-Move operation was performed by the user (step S302). When the Touch-Move operation was performed (YES in the step S302), the CPU 101 determines the direction of the Touch-Move operation (step S303).

When the Touch-Move operation was performed in a downward direction (a forward direction in the step S303), the CPU 101 determines whether the thumbnail images are positioned at the uppermost end. That is, the CPU 101 determines whether the uppermost end of the scrolling range has come (step S304).

When the uppermost end has come (YES in the step S304), the CPU 101 displays the shadows on the thumbnail images as mentioned above without scrolling the thumbnail images, and moves the shadows in the upward direction (a backward direction) in step S305. Then, the CPU 101 returns the process to the step S302. When the uppermost end has not come (NO in the step S304), the CPU 101 scrolls the thumbnail images in the downward direction (forward direction) in step S306. Then, the CPU 101 returns the process to the step S302.

When the Touch-Move operation was performed in the upward direction (backward direction in the step S303), the CPU 101 determines whether the thumbnail images are positioned at the lowermost end. That is, the CPU 101 determines whether the lowermost end of the scrolling range has come (step S307).

When the lowermost end has come (YES in the step S307), the CPU 101 displays the shadows on the thumbnail images as mentioned above without scrolling the thumbnail images, and moves the shadows in the downward direction (forward direction) in step S308. Then, the CPU 101 returns the process to the step S302. When the lowermost end has not come (NO in the step S307), the CPU 101 scrolls the thumbnail images in the upward direction (backward direction) in step S309. Then, the CPU 101 returns the process to the step S302.

When the Touch-Move operation was not performed (NO in the step S302), the CPU 101 determines whether the shadows have already been displayed on the thumbnail images (step S310). When the shadows have already been displayed on the thumbnail images (YES in the step S310), the CPU 101 moves the shadows in a direction approaching to the thumbnail images until overlapping with the thumbnail images as mentioned above (step S311). Then, the CPU 101 returns the process to the step S302.

When no shadows have been displayed yet on the thumbnail images (NO in the step S310), the CPU 101 determines whether a predetermined terminating condition was satisfied (for example, predetermined standby time was passed) in step S312. When the terminating condition was satisfied (YES in the step S312), the CPU 101 finishes the display control process. On the other hand, when the terminating condition is not satisfied (NO in the step S312), the CPU 101 returns the process to the step S302.

It should be noted that the example that displays the thumbnail images in a two-line-and-two-row matrix as indices so as to allow the scrolling in the up-and-down directions as shown in FIG. 2A was described. On the other hand, when the thumbnail images are displayed in a matrix other than the two-line-and-two-row matrix as indices, the display control process is preferably performed similarly. Moreover, when the thumbnail images are scrolled in left-and-right directions, the display control process is preferably performed similarly.

Thus, the thumbnail images are scrolled when the predetermined user's operation, such as the Touch-Move operation, is detected in the first embodiment of the present invention. Then, when the end of the scrolling range has come, the shadows are displayed on the thumbnail images and move in the direction opposite to the scrolling direction. This is capable of making a user feel a fact that the user's operation is received and of notifying the user that then end of the scrolling range has come.

Subsequently, one example of a PC equipped with a display control apparatus according to a second embodiment of the present invention will be described. It should be noted that the configuration of the PC according to the second embodiment is the same as that of the PC shown in FIG. 1.

In the above-mentioned first embodiment, the plurality of thumbnail images are displayed on the display unit 105 as indices, and the thumbnail images are scrolled in the forward direction or the backward direction in response to the Touch-Move operation. Then, when the end of the scrolling range has come, the scrolling of the thumbnail images is stopped, the shadows are displayed on the thumbnail images and are moved in the backward direction or the forward direction. On the other hand, in the second embodiment, when the end of scrolling range has come, the scrolling of the thumbnail images is stopped, a transparent thumbnail image (a transparent displaying object) is displayed for each of the thumbnail images and is moved in the same direction as the scrolling direction.

It should be noted that the thumbnail images are arranged in order from the left end to the right end in the first row and then from the left end to the right end of the following row according to the file name, the image number, or a photographing date-and-time.

Figure 4A:
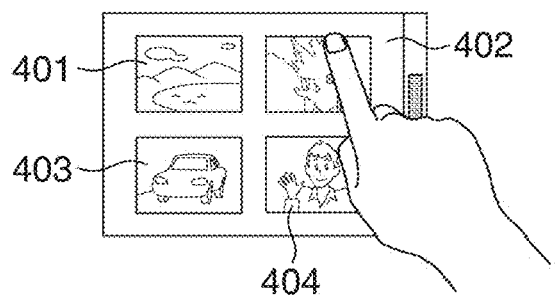
FIG. 4A through FIG. 4G are views for describing an example of transition of a screen displayed on a display unit of a PC according to a second embodiment of the present invention.
Figure 4B:
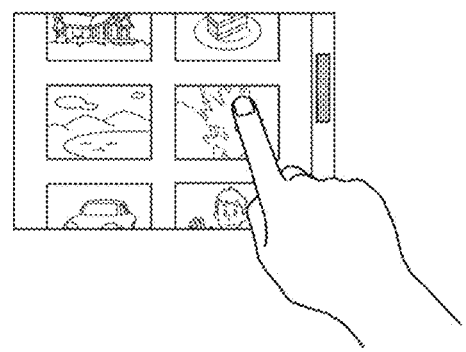
Figure 4C:
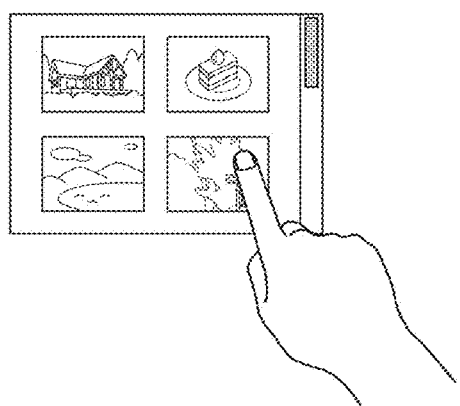
Figure 4D:
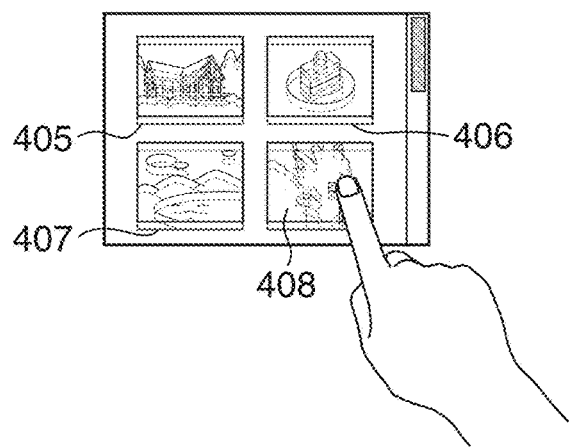
Figure 4E:
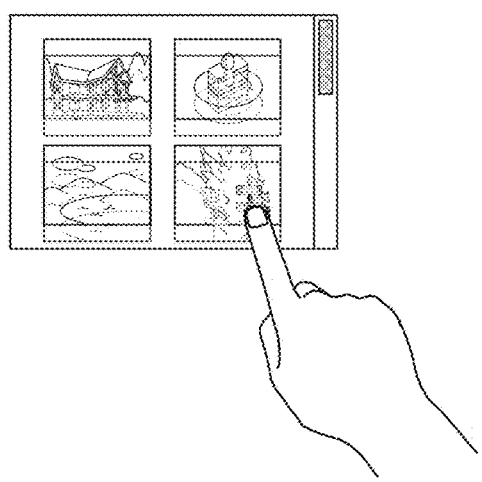
Figure 4F:
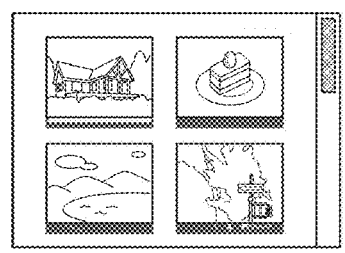
Figure 4G:
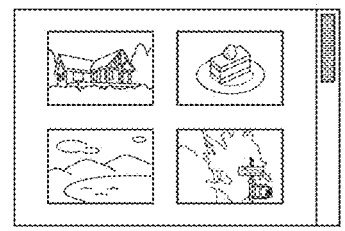

FIG. 4A through FIG. 4G are views for describing an example of transition of the screen displayed on a display unit in the PC according to the second embodiment of the present invention. FIG. 4A is a view showing a state where the Touch-Down operation has been performed, and FIG. 4B is a view showing a state where the Touch-Move operation has been performed downwardly. Moreover, FIG. 4C is a view showing a state where a scrolling end has come. FIG. 4D and FIG. 4E are views showing states where the downward Touch-Move operation continued after reaching the scrolling end. Furthermore, FIG. 4F is a view showing a state of the Touch-Up after completing the Touch-Move operation, and FIG. 4G is a view showing the Touch-Off state where the transparent thumbnail images are returned to the positions of the original thumbnail images (i.e., a state where the transparent thumbnail images disappear).

In FIG. 4A, thumbnail images 401 through 404 are displayed on the display unit 105. In the state shown in FIG. 4A, the thumbnail images 401 through 404 have not reached the scrolling end. The user shall perform the Touch-Down operation to the screen in this state.

FIG. 4B shows a state where the user performed the Touch-Move operation downwardly in the drawing. The CPU 101 scrolls the thumbnail images downwardly in response to the Touch-Move operation.

FIG. 4C shows a state where the Touch-Move operation is continuing downwardly and where the scrolling end has come. When the scrolling end has come, the CPU 101 stops scrolling the thumbnail images.

FIG. 4D and FIG. 4E show states where the Touch-Move operation is continuing downwardly after reaching the scrolling end. When the Touch-Move operation continues after reaching the scrolling end, the CPU 101 displays transparent thumbnail images 405 through 408 that are obtained by converting the thumbnail images into a transmission state (see FIG. 4D). Then, when the Touch-Move operation is further continued, the CPU 101 moves the transparent thumbnail images (transparent displaying objects: ghosts) 405 through 408 downwardly (see FIG. 4E). In this case, the CPU 101 sets movement speed of the transparent thumbnail images to speed corresponding to the former movement speed (i.e., the scrolling speed) of the thumbnail images.

Thus, the transparent thumbnail images are moved in response to the user's Touch-Move operation after stopping scrolling the thumbnail images. Accordingly, the user clearly recognizes that the Touch-Move operation is received and that the scrolling of the thumbnail images stopped (i.e., the scrolling end has come).

As shown in FIG. 4F, when the Touch-Move operation completes and the Touch-Up is detected, the CPU 101 moves the transparent thumbnail images 405 through 408 downwardly so as to return toward the positions of the original thumbnail images. That is, the CPU 101 moves each of the transparent thumbnail images 405 through 408 so that an overlapped area between the transparent thumbnail image and the original thumbnail image becomes larger. When the Touch-Off state has come as shown in FIG. 4G, the CPU 101 returns the transparent thumbnail images to the positions of the original thumbnail images and stops displaying the transparent thumbnail images (i.e., the transparent thumbnail images disappear).

FIG. 5 is a flowchart for describing a display control process performed by the PC according to the second embodiment of the present invention.

It should be noted the process in the flowchart shown in FIG. 5 is performed when the CPU 101 develops and runs the program stored in the nonvolatile memory 103 to the work memory area in the memory 102. Moreover, the steps in the illustrated flowcharts that are identical to the steps in FIG. 3 are indicated by the same reference numbers and their descriptions are omitted.

When determining that the uppermost end has come in the step S304, the CPU 101 displays the transparent thumbnail images as mentioned above without scrolling the thumbnail images, and moves the transparent thumbnail images in the downward direction (forward direction) in step S501. Then, the CPU 101 returns the process to the step S302.

When the lowermost end is reached (YES in the step S307), the CPU 101 displays the transparent thumbnail images without scrolling the thumbnail images, and moves the transparent thumbnail images in the upward direction (backward direction) in step S502. Then, the CPU 101 returns the process to the step S302.

When the Touch-Move operation is not performed (NO in the step S302), the CPU 101 determines whether the transparent thumbnail images have already been displayed (step S503). When the transparent thumbnail images have already been displayed (YES in the step S503), the CPU 101 moves the transparent thumbnail images in the former direction until overlapping with the thumbnail images as mentioned above (step S504). Then, the CPU 101 returns the process to the step S302. On the other hand, when no transparent thumbnail images have been displayed yet (NO in the step S503), the CPU 101 proceeds with the process to the step S312.

When the thumbnail images are displayed in a matrix other than the two-line-and-two-row matrix as indices, the display control process is preferably performed similarly also in the second embodiment. Moreover, when the thumbnail images are scrolled in left-and-right directions, the display control process is preferably performed similarly.

Thus, the thumbnail images are scrolled when the predetermined user's operation, such as the Touch-Move operation, is detected in the second embodiment of the present invention. Then, when the end of the scrolling range has come, the transparent thumbnail images are displayed and are moved in the direction identical to the scrolling direction. This is capable of making a user feel a fact that the user's operation is received and of notifying the user that the end of the scrolling range has come.

Incidentally, the above-mentioned first and second embodiments are capable of making a user feel the fact that the Touch-Move operation is received in the state where a plurality of thumbnail images are displayed on the display unit 105. When the shadows or the transparent thumbnail images are displayed over the entire display area of the display unit 105 as mentioned above, the moving distance of the shadow or the transparent thumbnail image becomes small relatively with respect to the area of the display unit. Accordingly, when one thumbnail image is displayed on the display unit 105, the effect that makes a user feel continuation of scrolling is lowered.

Furthermore, when the Touch-Move operation is no longer detected, a display is controlled so as to return the shadow or the transparent thumbnail image of the thumbnail image to the original position in the first and second embodiments. According to such display control, the user is more effectively notified that the Touch-Move operation is not detected as compared with a case where the movement of the shadow or the transparent thumbnail image is stopped. Then, since the shadow or the transparent thumbnail image of the thumbnail image is returned to the original state, the user does not feel uneasiness about whether the PC is operating normally.

Subsequently, one example of a PC equipped with a display control apparatus according to a third embodiment of the present invention will be described. It should be noted that the configuration of the PC according to the third embodiment is the same as that of the PC shown in FIG. 1.

In the above-mentioned first embodiment, the plurality of thumbnail images are displayed on the display unit 105 as indices, and the thumbnail images are scrolled in the forward direction or the backward direction in response to the Touch-Move operation. Then, when the end of the scrolling range has come, the scrolling of the thumbnail images is stopped, the shadows are displayed on the thumbnail images and are moved in the backward direction or the forward direction. On the other hand, in the third embodiment, when the end of the scrolling range has come, the scrolling of thumbnail images is stopped. Then, a shadow is displayed on each of the thumbnail images so as to separate from the thumbnail image in response to the Touch-Move operation. Furthermore, density of the shadow becomes thinner as the distance from the original thumbnail image increases.

Figure 6A:
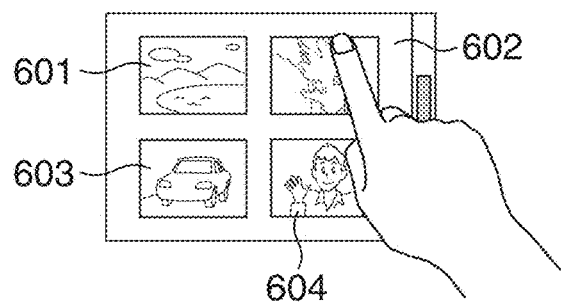
FIG. 6A through FIG. 6G are views for describing an example of transition of a screen displayed on a display unit of a PC according to a third embodiment of the present invention.
Figure 6B:
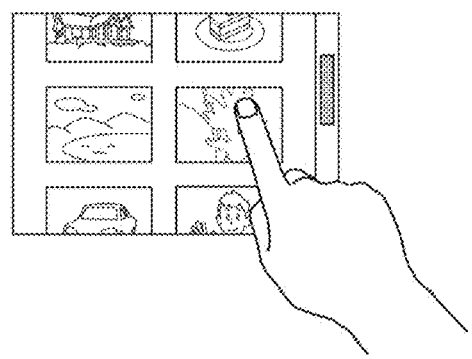
Figure 6C:
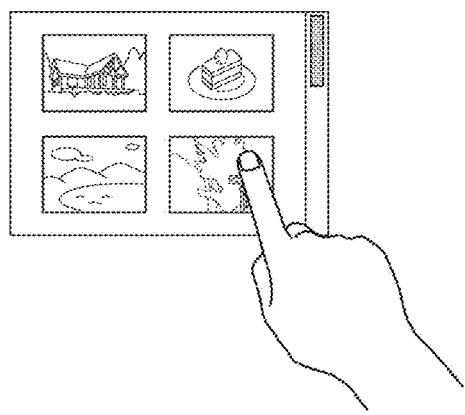
Figure 6D:
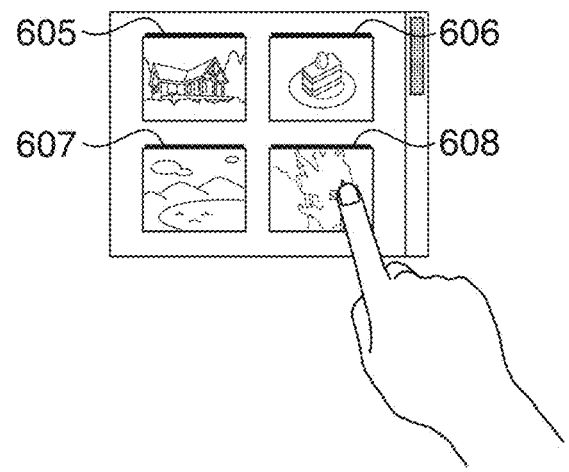
Figure 6E:
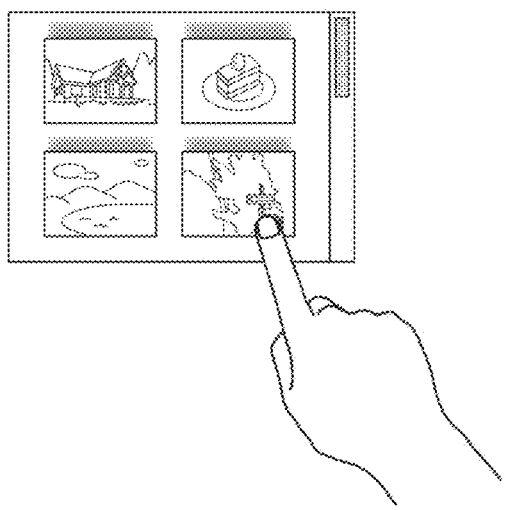
Figure 6F:
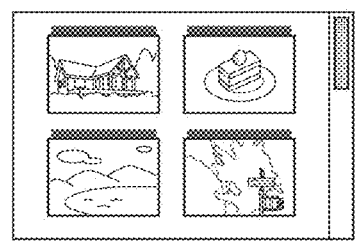
Figure 6G:
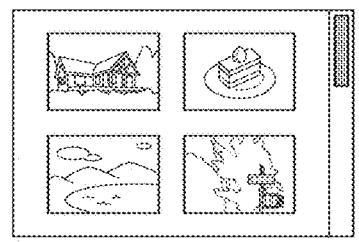

FIG. 6A through FIG. 6G are views for describing an example of transition of a screen displayed on the display unit of the PC according to the third embodiment of the present invention. FIG. 6A is a view showing a state where the Touch-Down operation has been performed, and FIG. 6B is a view showing a state where the Touch-Move operation has been performed downwardly. Moreover, FIG. 6C is a view showing a state where a scrolling end has come. FIG. 6D and FIG. 6E are views showing states where the downward Touch-Move operation continued after reaching the scrolling end. Furthermore, FIG. 6F is a view showing a state of the Touch-Up after completing the Touch-Move operation, and FIG. 6G is a view showing the Touch-Off state where the shadows are returned to the positions of the original thumbnail images (i.e., a state where the shadows disappear).

In FIG. 6A, thumbnail images 601 through 604 are displayed on the display unit 105. In the state shown in FIG. 6A, the thumbnail images 601 through 604 have not reached the scrolling end. The user shall perform the Touch-Down operation to the screen in this state.

FIG. 6B shows a state where the user performed the Touch-Move operation downwardly in the drawing. The CPU 101 scrolls the thumbnail images downwardly in response to the Touch-Move operation.

FIG. 6C shows a state where the Touch-Move operation is continuing downwardly and where the scrolling end has come. When the scrolling end has come, the CPU 101 stops scrolling the thumbnail images.

FIG. 6D shows a state where the Touch-Move operation is continuing downwardly just after reaching the scrolling end. When the Touch-Move operation continues just after reaching the scrolling end, the CPU 101 draws and displays shadows 605 through 608 on the respective thumbnail images.

FIG. 6E shows a state where the user further continues the Touch-Move operation downwardly. When the user continues the Touch-Move operation after displaying the shadows 605 through 608, the CPU 101 moves the shadows 605 through 608 upwardly and thins down the densities of the shadows.

This gives the user an illusion as if the thumbnail images move in the same direction until now by moving the shadows of the thumbnail images in spite of the fact that the scrolling of the thumbnail image has stopped. In this case, since the densities of the shadows thin down as the distances from the thumbnail images increase, the user feels that the shadows separated from the original thumbnail images more than the actual distances. This further improves the effect that the user feels that the thumbnail images move in the same direction until now.

Although the densities of the shadows thin down as the distances from the original thumbnail images increase in the above-mentioned example, sizes of the shadows may be reduced with the distances or outlines of the shadows may be indefinite with the distances, for example.

As shown in FIG. 6F, when the Touch-Move operation completes and the Touch-Up is detected, the CPU 101 moves the shadows of the thumbnail images downwardly so as to return toward the positions of the original thumbnail images. In this case, the densities of the shadows become thicker as the shadows approach the original thumbnail images. When the Touch-Off state has come as shown in FIG. 6G, the CPU 101 returns the shadows to the positions of the original thumbnail images and stops displaying the shadows.

Thus, when the end of the scrolling range has come, the shadows of the thumbnail images are displayed and are moved in the direction away from the original thumbnail images according to the third embodiment of the present invention. In this case, the densities of the shadows thin down as the distances from the original thumbnail images increase. This is capable of making a user feel a fact that the user's operation is received and of notifying the user that the end of the scrolling range has come.

Subsequently, one example of a PC equipped with a display control apparatus according to a fourth embodiment of the present invention will be described. It should be noted that the configuration of the PC according to the fourth embodiment is the same as that of the PC shown in FIG. 1.

In the above-mentioned second embodiment, the plurality of thumbnail images are displayed on the display unit 105 as indices, and the thumbnail images are scrolled in the forward direction or the backward direction in response to the Touch-Move operation. When the scrolling end has come, the scrolling of the thumbnail images is stopped and the transparent thumbnail images are displayed for the respective thumbnail images. Then the transparent thumbnail images are moved in the same direction as the scrolling direction. On the other hand, in the fourth embodiment, when the end of the scrolling range has come, the scrolling of the thumbnail images is stopped. Then, transparent thumbnail images are displayed for the respective thumbnail images so that the transparent thumbnail images separate from the original thumbnail images in response to the Touch-Move operation. In this case, a transmittance (transmitting degree) of the transparent thumbnail image is increased as a distance from the original thumbnail image increases.

Figure 7A:
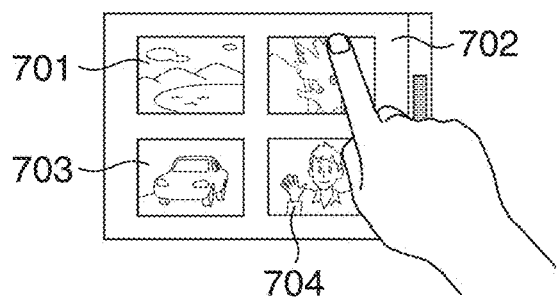
FIG. 7A through FIG. 7G are views for describing an example of transition of a screen displayed on a display unit of a PC according to a fourth embodiment of the present invention.
Figure 7B:
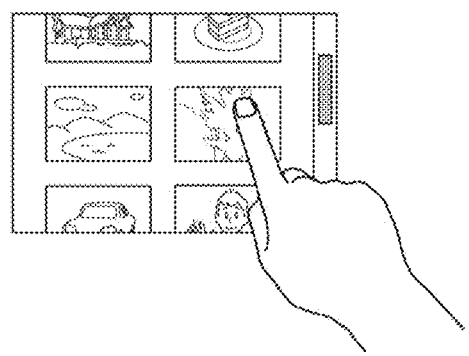
Figure 7C:
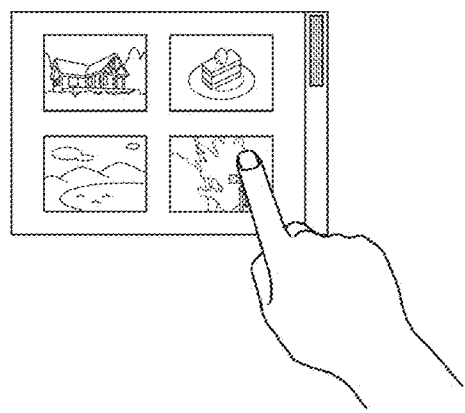
Figure 7D:
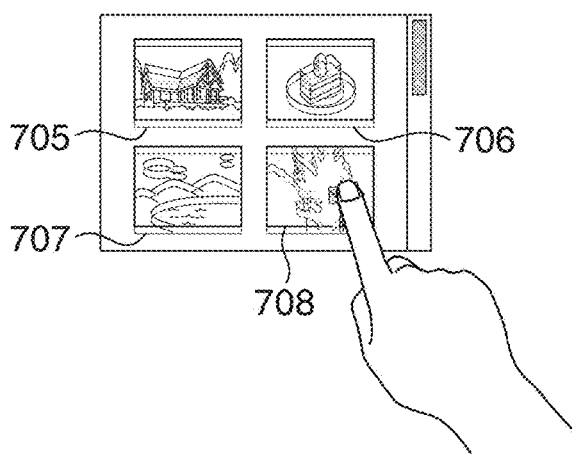
Figure 7E:
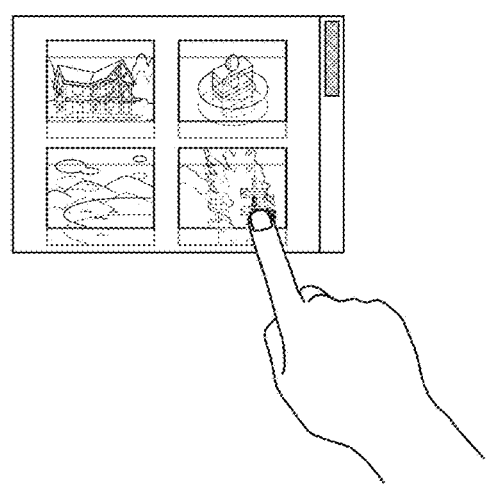
Figure 7F:
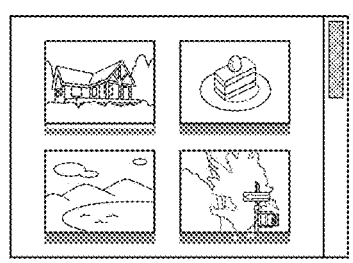
Figure 7G:
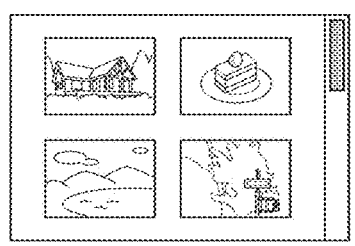

FIG. 7A through FIG. 7G are views for describing an example of transition of a screen displayed on a display unit of the PC according to the fourth embodiment of the present invention. FIG. 7A is a view showing a state where the Touch-Down operation has been performed, and FIG. 7B is a view showing a state where the Touch-Move operation has been performed downwardly. Moreover, FIG. 7C is a view showing a state where a scrolling end has come. FIG. 7D and FIG. 7E are views showing states where the downward Touch-Move operation continued after reaching the scrolling end. Furthermore, FIG. 7F is a view showing a state of the Touch-Up after completing the Touch-Move operation. And FIG. 7G is a view showing a Touch-Off state where the transparent thumbnail images are returned to the positions of the original thumbnail images (i.e., a state where the transparent thumbnail images disappear).

In FIG. 7A, thumbnail images 701 through 704 are displayed on the display unit 105. In the state shown in FIG. 7A, the thumbnail images 701 through 704 have not reached the scrolling end. The user shall perform the Touch-Down operation to the screen in this state.

FIG. 7B shows a state where the user performed the Touch-Move operation downwardly in the drawing. The CPU 101 scrolls the thumbnail images downwardly in response to the Touch-Move operation.

FIG. 7C shows a state where the Touch-Move operation is continuing downwardly and where the scrolling end has come. When the scrolling end has come, the CPU 101 stops scrolling the thumbnail images.

FIG. 7D shows a state where the Touch-Move operation is continuing downwardly just after reaching the scrolling end. When the Touch-Move operation continues just after reaching the scrolling end, the CPU 101 displays transparent thumbnail images 705 through 708 below the thumbnail images 701 through 704.

FIG. 7E shows a state where the user further continues the Touch-Move operation downwardly. When the user continues the Touch-Move operation after the transparent thumbnail images 705 through 708 are displayed, the CPU 101 moves the transparent thumbnail images 705 through 708 downwardly, and increases the transmittance with the movement.

This gives the user an illusion as if the thumbnail images move in the same direction until now by moving the transparent thumbnail image in spite of the fact that the scrolling of the thumbnail image has stopped. In this case, since the transmittances of the transparent thumbnail images increase as the distances from the thumbnail images increase, the user feels that the transparent thumbnail images separated from the thumbnail images more than the actual distances. This further improves the effect that the user feels that the thumbnail images move in the same direction until now.

Although the transmittances of the transparent thumbnail images increase as the distances from the original thumbnail images increase in the above-mentioned example, sizes of the transparent thumbnail images may be reduced with the distances or outlines of the transparent thumbnail images may be indefinite with the distances, for example.

As shown in FIG. 7F, when the Touch-Move operation completes and the Touch-Up is detected, the CPU 101 moves the transparent thumbnail images of the thumbnail images upwardly so as to return toward the positions of the original thumbnail images. In this case, the transmittances of the transparent thumbnail images decrease as the transparent thumbnail images approach the original thumbnail images. When the Touch-Off state has come as shown in FIG. 7G, the CPU 101 returns the transparent thumbnail images to the positions of the original thumbnail images and stops displaying the transparent thumbnail images.

Thus, when the end of the scrolling range has come, the transparent thumbnail images of the thumbnail images are displayed and are moved in the direction away from the original thumbnail images according to the fourth embodiment of the present invention. In this case, the transmittances of the transparent thumbnail images increase as the distances from the original thumbnail images increase. This is capable of making a user feel a fact that the user's operation is received and of notifying the user that the end of the scrolling range has come.

Subsequently, one example of a PC equipped with a display control apparatus according to a fifth embodiment of the present invention will be described. It should be noted that the configuration of the PC according to the fifth embodiment is the same as that of the PC shown in FIG. 1.

Figure 8A:
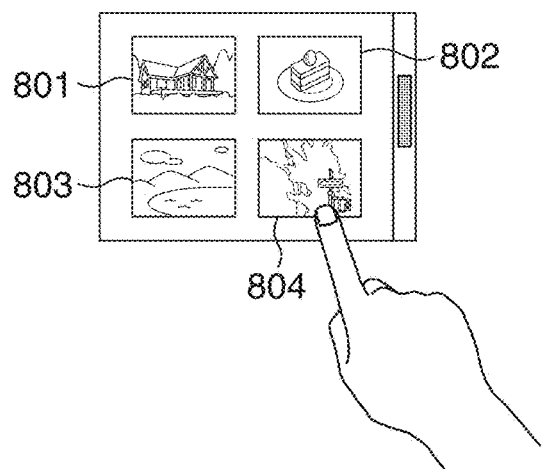
FIG. 8A through FIG. 8G are views for describing an example of transition of a screen displayed on a display unit of a PC according to a fifth embodiment of the present invention.
Figure 8B:
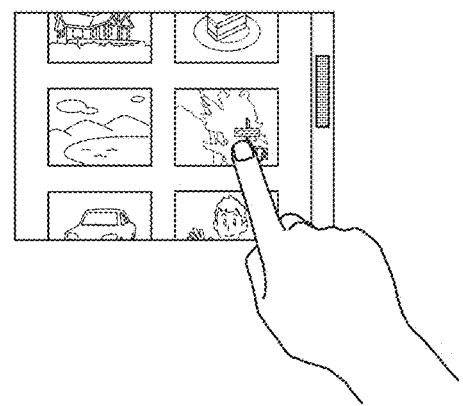
Figure 8C:
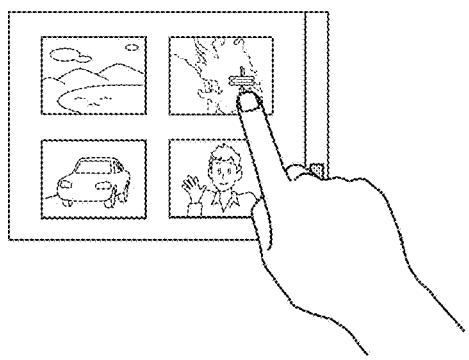
Figure 8D:
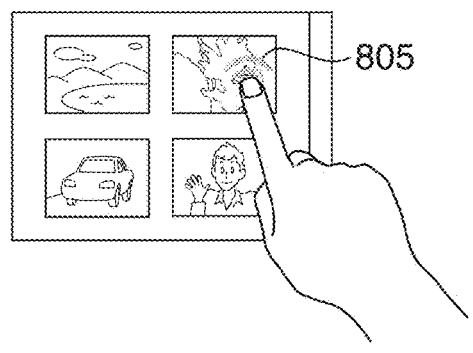
Figure 8E:
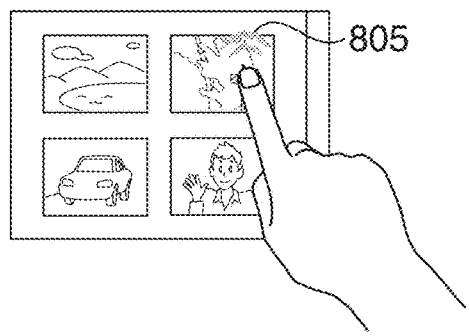
Figure 8F:
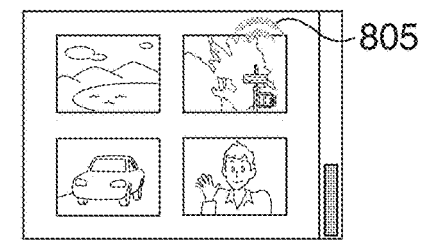
Figure 8G:
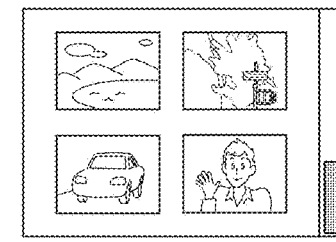

FIG. 8A through FIG. 8G are views for describing an example of transition of a screen displayed on the display unit of the PC according to the fifth embodiment of the present invention. FIG. 8A is a view showing a state where the Touch-Down operation has been performed, and FIG. 8B is a view showing a state where the Touch-Move operation has been performed upwardly. Moreover, FIG. 8C is a view showing a state where a scrolling end has come. FIG. 8D and FIG. 8E are views showing states where the upward Touch-Move operation continued after reaching the scrolling end. Furthermore, FIG. 8F is a view showing a state of the Touch-Up after completing the Touch-Move operation. And FIG. 8G is a view showing a Touch-Off state where the thumbnail images are returned to the original positions.

The CPU 101 displays a plurality of thumbnail images on the display unit 105 as indices. The CPU 101 scrolls the plurality of thumbnail images downwardly or upwardly in response to the downward Touch-Move operation or the upward Touch-Move operation by a user. When the scrolling end has come, the CPU 101 stops scrolling the thumbnail images. Then, the CPU 101 displays a displaying item that imitates a "ripple" near a touch point by the user, when the Touch-Move operation continues in the same direction after reaching the scrolling end. In the description, the "ripple(s)"

means a pattern like a single wave or multiple waves progressing in a traveling direction (scrolling direction) so that an arc spreads, for example. Furthermore, the CPU 101 moves the ripple(s) in the direction of the Touch-Move operation (i.e., the downward direction or the upward direction).

It should be noted that the thumbnail images are arranged in order from the left end to the right end in the first row and then from the left end to the right end of the following row according to the file name, the image number, or the photographing date-and-time.

In FIG. 8A, thumbnail images 801 through 804 are displayed on the display unit 105. In the state shown in FIG. 8A, the thumbnail images 801 through 804 have not reached the scrolling end. The user shall perform the Touch-Down operation to the screen in this state.

FIG. 8B shows a state where the user performed the Touch-Move operation (an instructing operation) upwardly in the drawing. The CPU 101 scrolls the thumbnail images upwardly in response to the Touch-Move operation.

FIG. 8C shows a state where the Touch-Move operation is continuing upwardly and where the scrolling end has come. When the scrolling end has come, the CPU 101 stops scrolling the thumbnail images.

FIG. 8D and FIG. 8E show states where the Touch-Move operation is continuing upwardly after reaching the scrolling end. When the Touch-Move operation continues after reaching the scrolling end, the CPU 101 draws and displays the concentric ripples 805 near the touch point by the user, for example (see FIG. 8D). The ripples 805 are a pattern including arcs that are convex in the scrolling direction. Then, when the Touch-Move operation is further continued, the CPU 101 moves the ripples 805 upwardly at a speed that is higher than a movement speed of the touch point by the user (see FIG. 8E).

Thus, the movement of the ripples 805 reminds the user of a situation that "while a paper sheet on which an image is drawn is slid by rubbing with a finger, the paper sheet stops sliding and creases (ripples) occur at the point that is rubbed with the finger because an edge of the paper sheet is pressed". As a result of this, the user clearly recognizes that the scrolling of the thumbnail images stops (i.e., the end of the scrolling range has come) and that the user's operation is received.

As shown in FIG. 8F, when the Touch-Move operation is completed, the CPU 101 displays the ripples 805 at the position away from the touch point by the user in the scrolling direction. After that, when the Touch-Off state has come as shown in FIG. 8G, the CPU 101 stops displaying the ripples 805 (i.e., the ripples disappear).

Figure 9A:
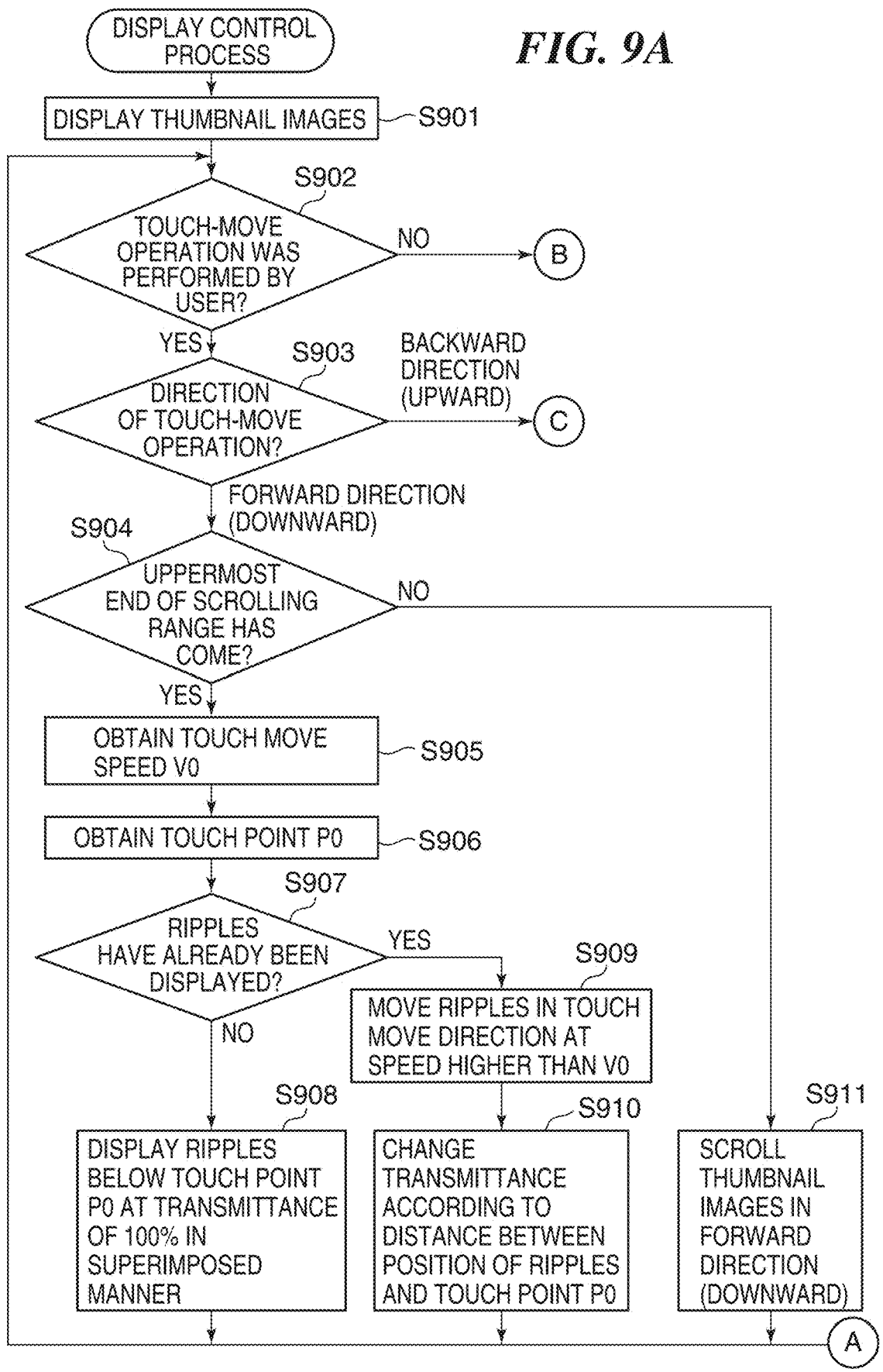
FIG. 9A is a flowchart for describing a part of a display control process performed by a PC according to a fifth embodiment of the present invention.
Figure 9B:
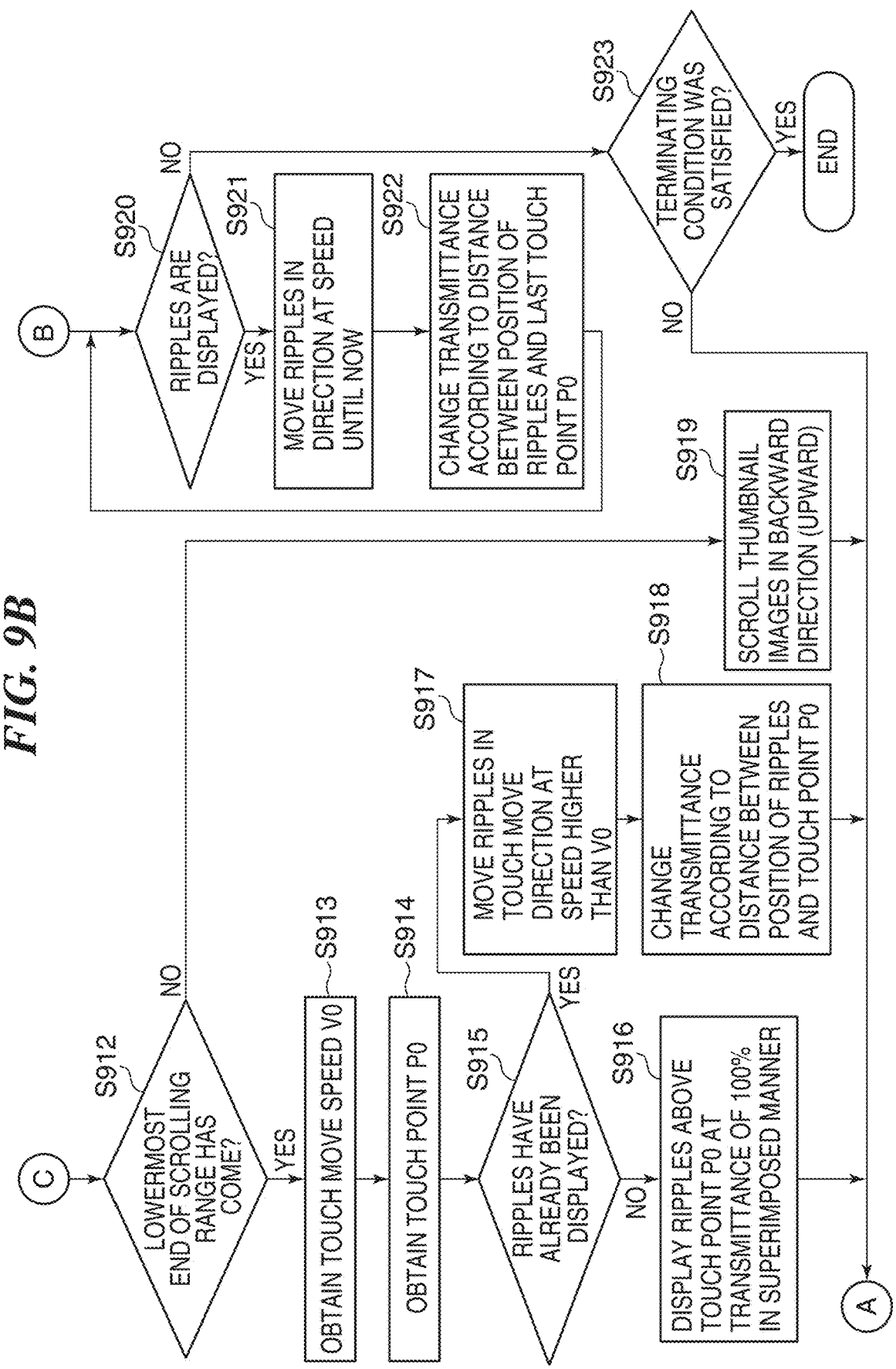
FIG. 9B is a flowchart for describing a remaining part of the display control process performed by the PC according to the fifth embodiment of the present invention.

FIG. 9A and FIG. 9B are flowcharts for describing a display control process performed by the PC according to the fifth embodiment of the present invention. It should be noted the process in the flowchart shown in FIG. 3 is performed when the CPU 101 develops and runs the program stored in the nonvolatile memory 103 to a work memory area in the memory 102.

When the display control process is started, the CPU 101 displays thumbnail images on the display unit 105 as indices (step S901). Then, the CPU 101 determines whether the Touch-Move operation was performed by the user (step S902). When the Touch-Move operation was performed (YES in the step S902), the CPU 101 determines the direction of the Touch-Move operation (step S903).

When the Touch-Move operation was performed in the downward direction (the forward direction in the step S903), the CPU 101 determines whether the thumbnail images are positioned at the uppermost end. That is, the CPU 101 determines whether the uppermost end of the scrolling range has come (step S904).

When the uppermost end has come (YES in the step S904), the CPU 101 obtains a speed V0 of the Touch-Move operation (Touch-Move speed) in step S905. Subsequently, the CPU 101 obtains the user's touch point (touch position coordinate) P0 in step S906.

Next, the CPU 101 determines whether the ripples have already been displayed on the screen (step S907). When no ripples have been displayed yet (NO in the step S907), the CPU 101 displays the ripples so as to be superimposed on the thumbnail image below the touch point P0 at the transmittance of "100%" (a transparent state) in step S908. Then, the CPU 101 returns the process to the step S902.

When the ripples have already been displayed (YES in the step S907), the CPU 101 moves the ripples concerned at a speed faster than the movement speed V0 downwardly (step S909). Subsequently, the CPU 101 changes the transmittance according to the distance between the position of the ripples and the touch point P0 (step S910). Specifically, the transmittance decreases as the distance between the position of the ripples and the touch point P0 increases. As a result, when the downward Touch-Move operation continues, the ripples appear and the tone of the ripples gradually becomes darker. Then, the CPU 101 returns the process to the step S902.

When the uppermost end has not come (NO in the step S904), the CPU 101 scrolls the thumbnail images in the downward direction (forward direction) in step S911. Then, the CPU 101 returns the process to the step S902.

When the Touch-Move operation was performed in the upward direction (backward direction in the step S903), the CPU 101 determines whether the thumbnail images are positioned at the lowermost end. That is, the CPU 101 determines whether the lowermost end of the scrolling range has come (step S912).

When the lowermost end has come (YES in the step S912), the CPU 101 obtains the Touch-Move speed V0 (step S913). Subsequently, the CPU 101 obtains the touch point P0 by the user (step S914). Then, the CPU 101 determines whether the ripples have already been displayed on the screen (step S915).

When the ripples have not been displayed yet (NO in the step S915), the CPU 101 displays the ripples so as to be superimposed on the thumbnail image above the touch point P0 at the transmittance of "100" (step S916). Then, the CPU 101 returns the process to the step S902.

When the ripples have already been displayed (YES in the step S915), the CPU 101 moves the ripples concerned at a speed faster than the movement speed V0 upwardly (step S917). Subsequently, the CPU 101 changes the transmittance according to the distance between the position of the ripples and the touch point P0 (step S918). Specifically, the transmittance decreases as the distance between the position of the ripples and the touch point P0 increases. As a result, when the upward Touch-Move operation continues, the ripples appear and the tone of the ripples gradually becomes darker. Then, the CPU 101 returns the process to the step S902.

When the lowermost end has not come (NO in the step S912), the CPU 101 scrolls the thumbnail images in the downward direction (hard flow) in step S911. Then, the CPU 101 returns the process to the step S902.

When the Touch-Move operation was not performed (NO in the step S902), the CPU 101 determines whether the ripples have already been displayed on the screen (step S920). When the ripples have already been displayed (YES in the step S920), the CPU 101 moves the ripples in the direction in which the ripples moved until now at the same speed at which the ripples moved until now (step S921). Furthermore, the CPU 101 reduces the transmittance as the distance between the position of the ripples and the last touch point P0 increases (step S922). Then, the CPU 101 returns the process to the step S920.

When no ripples have been displayed yet (NO in the step S920), the CPU 101 determines whether a predetermined terminating condition was satisfied (for example, predetermined standby time was passed) in step S923. It should be noted that no ripples are displayed when the ripples moved beyond the display area of the display unit 105, for example. When the terminating condition was satisfied (YES in the step S923), the CPU 101 finishes the display control process. On the other hand, when the terminating condition is not satisfied (NO in the step S923), the CPU 101 returns the process to the step S902.

It should be noted that the example that displays the thumbnail images in a two-line-and-two-row matrix as indices so as to allow the scrolling in the up-and-down directions as shown in FIG. 8A was described. On the other hand, when the thumbnail images are displayed in a matrix other than the two-line-and-two-row matrix as indices, the display control process is preferably performed similarly. Moreover, when the thumbnail images are scrolled in left-and-right directions, the display control process is preferably performed similarly.

As mentioned above, the movement of the ripples reminds the user of the situation that "while a paper sheet on which an image is drawn is slid by rubbing with a finger, the paper sheet stops sliding and creases (ripples) occur at the point that is rubbed with the finger because an edge of the paper sheet is pressed". As a result of this, the user recognizes that the end of the scrolling range has come and that the user's operation is received.

Such ripples become darker as the distance from the point at which the ripples occur increases. Then, when the transmittance of the ripples becomes lower as the distance from the touch point increases (as the Touch-Move amount after reaching the scrolling end increases), the user recognizes that the ripples occur by the Touch-Move operation. Since this is coincident with a feeling that creases caused by pulling a paper sheet become larger as pulling force becomes larger, the user intuitively recognizes that the scrolling end has come.

It should be noted that ripples of which the transmittance is 0% may be displayed when the scrolling end has come. And the transmittance of the ripples may become higher as the Touch-Move amount in the same direction until reaching the scrolling end becomes larger after reaching the scrolling end. This gives the user an impression like ripples that occur by touching a water surface with a finger. That is, the ripples occur by touching the water surface with the finger. As the ripples go away, the ripples spread widely but the amplitude becomes smaller. This gives the user the impression that the ripples disappear.

It should be noted that the width of ripples may increase or outlines of the ripples may be indefinite with the distance from the touch point instead of changing the transmittance.

Thus, the thumbnail images are scrolled when the predetermined user's operation, such as the Touch-Move operation, is detected in the fifth embodiment of the present invention. Then, when the end of the scrolling range has come, the ripples are displayed near the touch point and are moved in the direction identical to the scrolling direction. This is capable of making a user feel a fact that the user's operation is received and of notifying the user that the end of the scrolling range has come.

Subsequently, one example of a PC equipped with a display control apparatus according to a sixth embodiment of the present invention will be described. It should be noted that the configuration of the PC according to the sixth embodiment is the same as that of the PC shown in FIG. 1.

In the above-mentioned fifth embodiment, the plurality of thumbnail images are displayed on the display unit 105 as indices, and the thumbnail images are scrolled in the forward direction or the backward direction in response to the Touch-Move operation. Then, when the scrolling end has come, the scrolling of the thumbnail images is stopped and the ripples are displayed near the touch point. The ripples are moved in the same direction as the direction of the user's operation (scrolling direction). On the other hand, in the sixth embodiment, when the scrolling end has come, the scrolling of the thumbnail images is stopped and "distortion" is formed in a thumbnail image near the touch point. That is, an image (a distorted image) that is obtained by distorting an original thumbnail image in the scrolling direction is displayed so as to be superimposed on the original thumbnail image.

It should be noted that the thumbnail images are arranged in order from the left end to the right end in the first row and then from the left end to the right end of the following row according to the file name, the image number, or a photographing date-and-time in the same manner as the fifth embodiment.

Figure 10A:
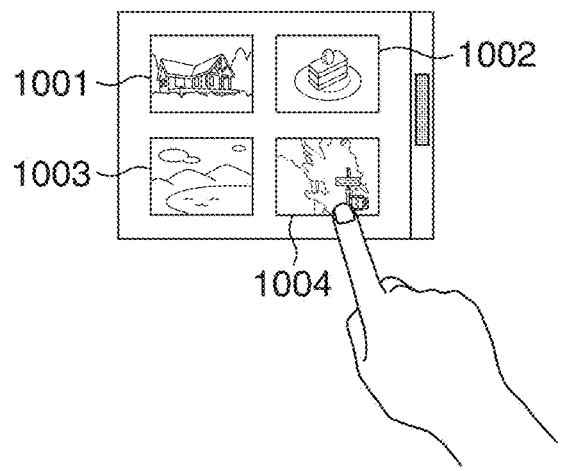
FIG. 10A through FIG. 10G are views for describing an example of transition of a screen displayed on a display unit of a PC according to a sixth embodiment of the present invention.
Figure 10B:
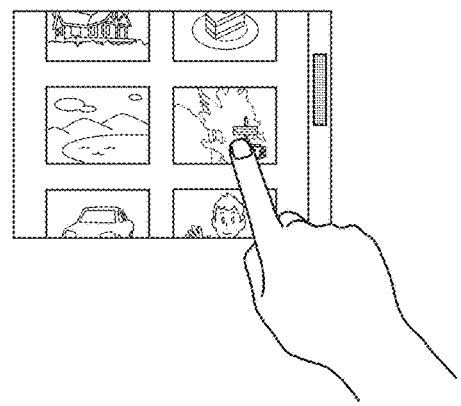
Figure 10C:
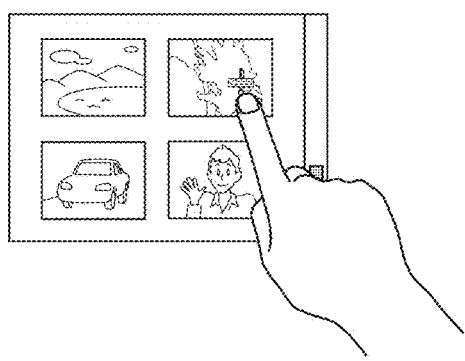
Figure 10D:
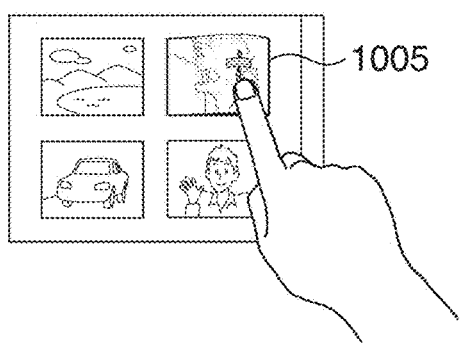
Figure 10E:
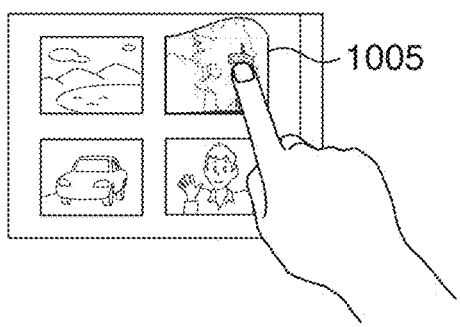
Figure 10F:
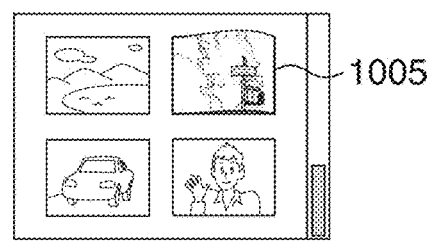
Figure 10G:
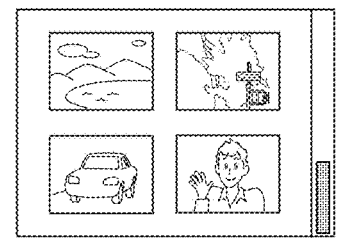

FIG. 10A through FIG. 10G are views for describing an example of transition of a screen displayed on the display unit of the PC according to the sixth embodiment of the present invention. FIG. 10A is a view showing a state where the Touch-Down operation has been performed, and FIG. 10B is a view showing a state where the Touch-Move operation has been performed upwardly. Moreover, FIG. 10C is a view showing a state where the scrolling end has come. FIG. 10D and FIG. 10E are views showing states where the upward Touch-Move operation continued after reaching the scrolling end. Furthermore, FIG. 10F is a view showing a state of the Touch-Up after completing the Touch-Move operation. And FIG. 10G is a view showing a Touch-Off state where the thumbnail images are returned to the original positions.

In FIG. 10A, thumbnail images 1001 through 1004 are displayed on the display unit 105. In the state shown in FIG. 10A, the thumbnail images 1001 through 1004 have not reached the scrolling end. The user shall perform the Touch-Down operation to the screen in this state.

FIG. 10B shows a state where the user performed the Touch-Move operation upwardly in the drawing. The CPU 101 scrolls the thumbnail images upwardly in response to the Touch-Move operation.

FIG. 10C shows a state where the Touch-Move operation is continuing upwardly and where the scrolling end has come. When the scrolling end has come, the CPU 101 stops scrolling the thumbnail images.

FIG. 10D and FIG. 10E show states where the user continues the upward Touch-Move operation after reaching the scrolling end. When the Touch-Move operation continues after reaching the scrolling end, the CPU 101 displays a distorted image 1005 that is obtained by distorting an original thumbnail image in the scrolling direction near the touch point by the user so as to be superimposed on the original thumbnail image (see FIG. 10D). Then, when the Touch-Move operation is further continued, the CPU 101 increases degree of distortion of the distorted image 1005 with the movement of the touch point (see FIG. 10E).

Thus, the distorted image is displayed in a superimposed manner in response to the user's Touch-Move operation after stopping scrolling the thumbnail images, and the degree of the distortion is increased with the movement of the touch point. This reminds the user of a situation that "while a paper sheet on which an image is drawn is slid by rubbing with a finger, the paper sheet stops sliding and distortion occurs at the point that is rubbed with the finger because an edge of the paper sheet is pressed". Accordingly, the user clearly recognizes that the Touch-Move operation is received and that the scrolling of the thumbnail images stopped (i.e., the scrolling end has come).

As shown in FIG. 10F, when the Touch-Move operation is completed, the CPU 101 decreases the degree of the distortion in the distorted image gradually. Then, when the Touch-Off state has come finally as shown in FIG. 10G, the CPU 101 stops displaying the distorted image (i.e., the distortion disappears).

Figure 11A:
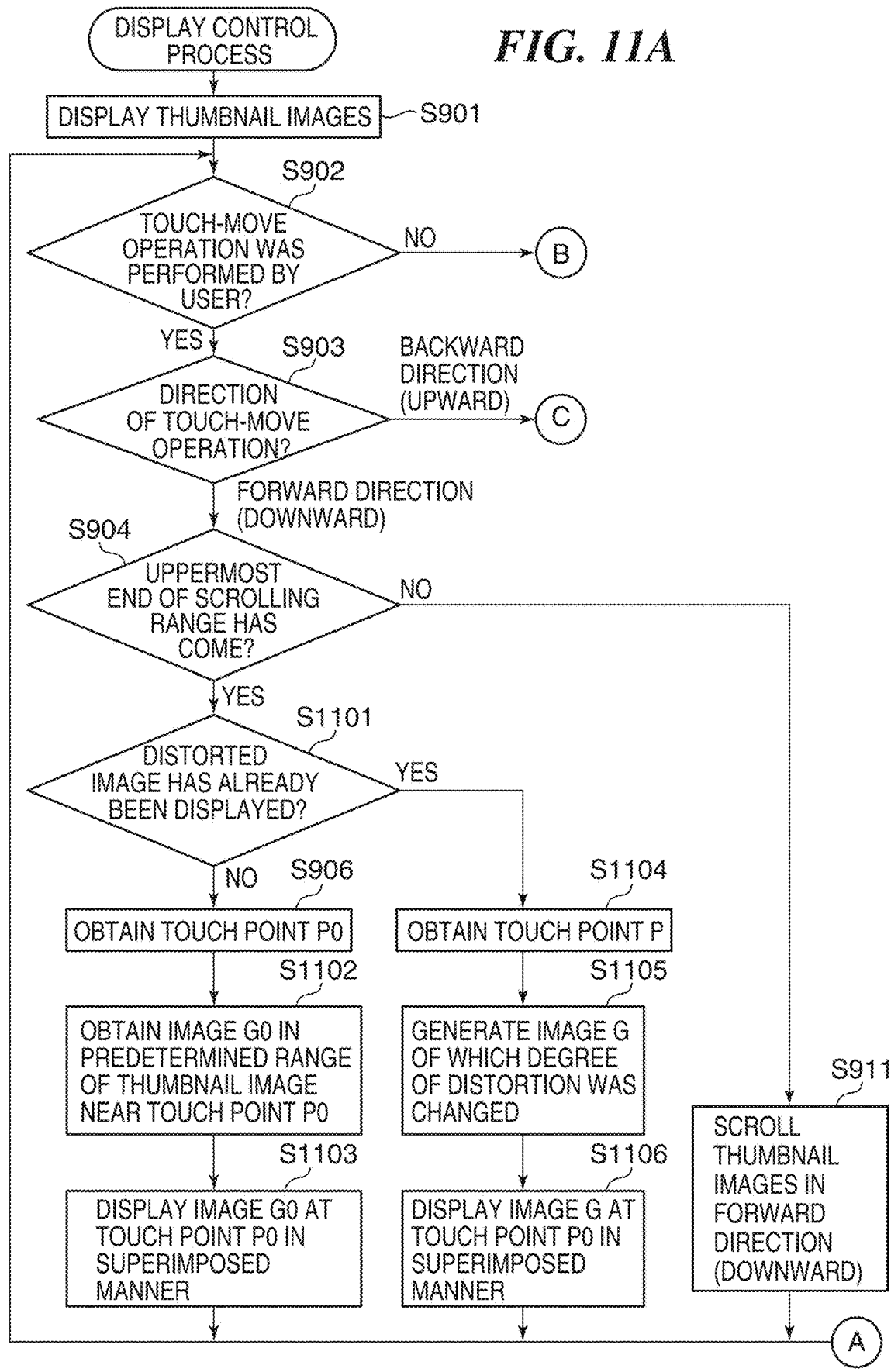
FIG. 11A is a flowchart for describing a part of a display control process performed by the PC according to the sixth embodiment of the present invention.
Figure 11B:
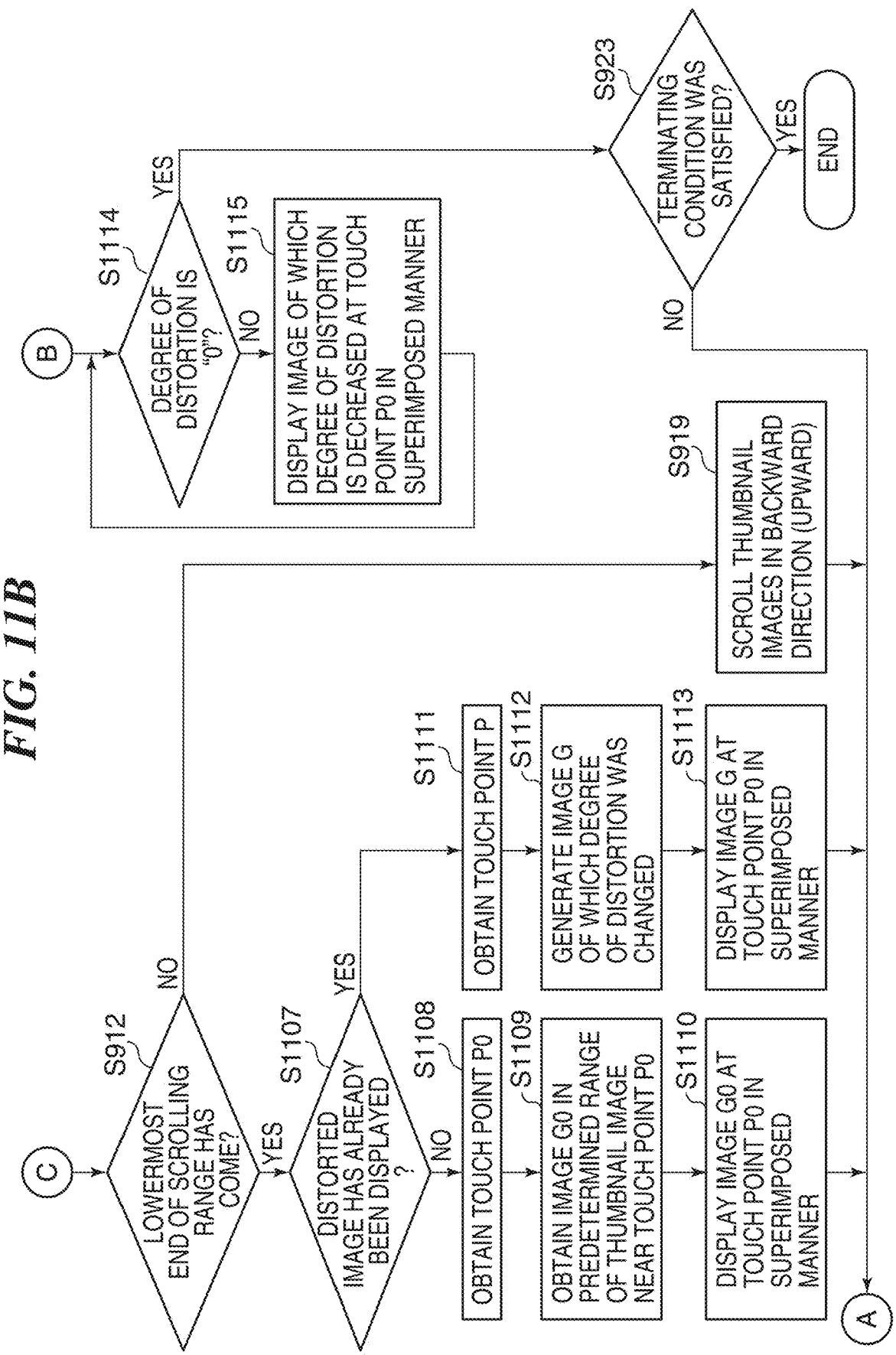
FIG. 11B is a flowchart for describing a remaining part of the display control process performed by the PC according to the sixth embodiment of the present invention.

FIG. 11A and FIG. 11B are flowcharts for describing a display control process performed by the PC according to the sixth embodiment of the present invention.

It should be noted the process in the illustrated flowcharts is performed when the CPU 101 develops and runs the program stored in the nonvolatile memory 103 to the work memory area in the memory 102. Moreover, the steps in the illustrated flowcharts that are identical to the steps in FIG. 9A and FIG. 9B are indicated by the same reference numbers and their descriptions are omitted.

When the uppermost end of the scrolling range has come (YES in the step S904), the CPU 101 determines whether the distorted image has already been displayed (step S1101). When the distorted image has not been displayed yet (NO in the step S1101), the CPU 101 proceeds with the process to the step S906 and obtains the touch point (touch position coordinate) P0 by the user.

Subsequently, the CPU 101 obtains an area in a predetermined range (i.e., a part of the image: an image G0) of the thumbnail image located near the touch point P0 (step S1102). Then, the CPU 101 displays the image G0 concerned as the distorted image (distorted object) in the superimposed manner at the touch point P0 (step S1103). Then, the CPU 101 returns the process to the step S902.

When the distorted image has already been displayed (YES in the step S1101), the CPU 101 obtains the touch point P by the user (step S1104). Then, the CPU 101 generates an image G (a distorted image) of which the degree of distortion is increased in the forward direction (i.e., downward direction) on the basis of the distance between the touch point P0 and the touch point P (step S1105). Subsequently, the CPU 101 displays the distorted image concerned in the superimposed manner at the touch point P0 (step S1106). Then, the CPU 101 returns the process to the step S902.

When the Touch-Move direction is the backward direction (the backward direction in the step S903), the CPU 101 proceeds with the process to the step S912 in FIG. 11B. When the lowermost end of the scrolling range has come (YES in the step S912), the CPU 101 determines whether the distorted image has already been displayed (step S1107). When the distorted image has not been displayed yet (NO in the step S1107), the CPU 101 obtains the touch point P0 by the user (step S1108).

Subsequently, the CPU 101 obtains the area in the predetermined range (the image G0) of the thumbnail image located near the touch point P0 (step S1109). Then, the CPU 101 displays the image G0 concerned as the distorted image in the superimposed manner at the touch point P0 (step S1110). Then, the CPU 101 returns the process to the step S902.

When the distorted image has already been displayed (YES in the step S1107), the CPU 101 obtains the touch point P by the user (step S1111). Then, the CPU 101 generates an image G (a distorted image) of which the degree of distortion is increased in the backward direction (i.e., the upward direction) on the basis of the distance between the touch point P0 and the touch point P (step S1112). Subsequently, the CPU 101 displays the distorted image concerned in the superimposed manner at the touch point P0 (step S1113). Then, the CPU 101 returns the process to the step S902.

When the Touch-Move operation was not performed (NO in the step S902), the CPU 101 determines whether the degree of the distortion of the thumbnail image is "0" (step S1114). When the degree of the distortion is "0" (YES in the step S1114), the CPU 101 proceeds the process to the step S923. On the other hand, when the degree of the distortion is not "0" (NO in the step S1114), the CPU 101 generates an image (a distorted image) of which the degree of the distortion is decreased, and displays the image generated in the superimposed manner at the touch point P0 (step S1115). Then, the CPU 101 returns the process to the step S1114.

When the thumbnail images are displayed in a matrix other than the two-line-and-two-row matrix as indices, the display control process is preferably performed similarly also in the sixth embodiment. Moreover, when the thumbnail images are scrolled in left-and-right directions, the display control process is preferably performed similarly.

When the scrolling end has come, the distorted image is displayed, and the degree of the distortion of the distorted image concerned increases with the distance from the touch point at as mentioned above. This reminds the user of the situation "while an elastic cloth on which an image is drawn is slid by rubbing with a finger, the paper sheet stops sliding and distortion occurs at the point that is rubbed with the finger because an edge of the elastic cloth is pressed". As a result of this, the user recognizes that the end of the scrolling range has come and that the user's operation is received.

The above-mentioned distortion becomes larger as the finger further slides after the end of the cloth was pressed. Accordingly, when the degree of the distortion is increased as the current touch point goes away from the touch point by the user at the timing when the scrolling end has come, the effect that makes a user recognize that the distortion has occurred by the Touch-Move operation is further improved.

Thus, the thumbnail images are scrolled when the predetermined user's operation, such as the Touch-Move operation, is detected in the sixth embodiment of the present invention. Then, the distorted image is displayed when the end of the scrolling range has come, and the degree of the distortion increases according to the movement of the touch point. This is capable of making a user feel a fact that the user's operation is received and of notifying the user that the end of the scrolling range has come.

It should be noted that the CPU 101 functions as the operation detection unit (touch detection unit) that detects the user's operation to the display unit 105 in the above-mentioned embodiments. Moreover, the above-mentioned various control processes that are described as what the CPU 101 performs may be performed by one hardware device or may be performed by sharing among a plurality of hardware devices to control the entire apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

Furthermore, the embodiments mentioned above show examples of the present invention, and it is capable of combining the embodiments suitably.

Moreover, although the example of the case where the present invention is applied to the PC is described in the above-mentioned embodiments, the present invention is not limited to this example and is applicable to an apparatus that has a display unit. That is, the present invention is applicable to a PDA, a cell phone, a portable image viewer, a printer equipped with a display unit, a digital photo frame, a game machine, an electronic-book reader, a tablet terminal, a smart phone, a household appliance apparatus equipped with a display unit, an on-board apparatus equipped with a display unit, etc.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

This application claims the benefit of Japanese Patent Applications No. 2016-176498 and No. 2016-176499, filed Sep. 9, 2016, which is hereby incorporated by reference herein in its entirety.

What is claimed is:

1. A display control apparatus comprising:
a display unit configured to display a displaying object;
an operation detection unit configured to detect a user's operation to said display unit; and
a display control unit configured to scroll the displaying object in a case where said operation detection unit detects an instructing operation of scrolling, to display a displaying item that imitates a ripple so as to be superimposed on the displaying object and to move the displaying item in a direction identical to a direction of scrolling by the instructing operation in a case where the instructing operation is not completed even if the displaying object has been scrolled to an end of a scrolling range,
wherein said operation detection unit is a touch detection unit that detects a touch operation to said display unit, and
wherein said display control unit displays and moves the displaying item in a case where a Touch-Move operation that moves a pointer while touching said display unit continues in a direction instructing the scrolling of the displaying object from a state not reaching the end of the scrolling range to a state reaching the end of the scrolling range.

2. The display control apparatus according to claim 1, wherein the displaying item is a pattern including arcs that are convex in a direction of the scrolling.

3. The display control apparatus according to claim 2, wherein the arcs are concentric patterns.

4. The display control apparatus according to claim 1, wherein said display control unit displays the displaying item so as to be superimposed on a displaying object that is displayed at a point at which the instructing operation is given on said display unit in a case where a plurality of displaying objects are displayed on said display unit.

5. The display control apparatus according to claim 1, wherein said display control unit disappears the displaying item in a case where said operation detection unit no longer detects the instructing operation.

6. The display control apparatus according to claim 1, wherein said display control unit moves the displaying item according to a movement of a point at which the instructing operation is given on said display unit in the same direction as the movement.

7. The display control apparatus according to claim 6, wherein said display control unit moves the displaying item at a speed higher than a movement speed of the point at which the instructing operation is given on said display unit.

8. The display control apparatus according to claim 7, wherein said display control unit increases a transmittance of the displaying item as the point at which the instructing operation is given on said display unit goes away from the displaying item.

9. A control method for a display control apparatus that displays a displaying object on a display unit, the control method comprising:
a detection step of detecting a user's operation to the display unit;
a first control step of scrolling the displaying object in a case where an instructing operation of scrolling is detected in said detection step; and
a second control step of displaying a displaying item that imitates a ripple so as to be superimposed on the displaying object and of moving the displaying item in a direction identical to a direction of scrolling by the instructing operation in a case where the instructing operation is not completed even if the displaying object has been scrolled to an end of a scrolling range;
wherein said detection step detects a touch operation to said display unit, and
wherein the second control step further comprises displaying and moving the displaying item in a case where a Touch-Move operation that moves a pointer while touching said display unit continues in a direction instructing the scrolling of the displaying object from a state not reaching the end of the scrolling range to a state reaching the end of the scrolling range.

10. A non-transitory computer-readable storage medium storing a control program causing a computer to execute a control method for a display control apparatus that displays a displaying object on a display unit, the control method comprising:
  a detection step of detecting a user's operation to the display unit;
  a first control step of scrolling the displaying object in a case where an instructing operation of scrolling is detected in said detection step; and
  a second control step of displaying a displaying item that imitates a ripple so as to be superimposed on the displaying object and of moving the displaying item in a direction identical to a direction of scrolling by the instructing operation in a case where the instructing operation is not completed even if the displaying object has been scrolled to an end of a scrolling range;
  wherein said detection step detects a touch operation to said display unit, and
  wherein said first control step further comprises displaying and moving the displaying item in a case where a Touch-Move operation that moves a pointer while touching said display unit continues in a direction instructing the scrolling of the displaying object from a state not reaching the end of the scrolling range to a state reaching the end of the scrolling range.

11. A display control apparatus comprising:
  a display unit configured to display a displaying object;
  an operation detection unit configured to detect a user's operation to said display unit; and
  a display control unit configured to scroll the displaying object in a case where said operation detection unit detects an instructing operation of scrolling, to display a displaying item that imitates a ripple so as to be superimposed on the displaying object and to move the displaying item in a direction identical to a direction of scrolling by the instructing operation in a case where the instructing operation is not completed even if the displaying object has been scrolled to an end of a scrolling range,
  wherein the displaying item is a pattern including arcs that are convex in a direction of the scrolling.

12. The display control apparatus according to claim 11, wherein the arcs are concentric patterns.

13. The display control apparatus according to claim 11, wherein said display control unit displays the displaying item so as to be superimposed on a displaying object that is displayed at a point at which the instructing operation is given on said display unit in a case where a plurality of displaying objects are displayed on said display unit.

14. The display control apparatus according to claim 11, wherein said display control unit disappears the displaying item in a case where said operation detection unit no longer detects the instructing operation.

15. The display control apparatus according to claim 11, wherein said display control unit moves the displaying item according to a movement of a point at which the instructing operation is given on said display unit in the same direction as the movement.

16. The display control apparatus according to claim 15, wherein said display control unit moves the displaying item at a speed higher than a movement speed of the point at which the instructing operation is given on said display unit.

17. The display control apparatus according to claim 16, wherein said display control unit increases a transmittance of the displaying item as the point at which the instructing operation is given on said display unit goes away from the displaying item.

18. A control method for a display control apparatus that displays a displaying object on a display unit, the control method comprising:
  a detection step of detecting a user's operation to said display unit; and
  a first control step of scrolling the displaying object in a case where an instructing operation of scrolling is detected in said detection step, and
  a second control step of displaying a displaying item that imitates a ripple so as to be superimposed on the displaying object and of moving the displaying item in a direction identical to a direction of scrolling by the instructing operation in a case where the instructing operation is not completed even if the displaying object has been scrolled to an end of a scrolling range,
  wherein the displaying item is a pattern including arcs that are convex in a direction of the scrolling.

19. A non-transitory computer-readable storage medium storing a control program causing a computer to execute a control method for a display control apparatus that displays a displaying object on a display unit, the control method comprising:
  a detection step of detecting a user's operation to said display unit; and
  a first control step of scrolling the displaying object in a case where an instructing operation of scrolling is detected in said detection step, and
  a second control step of displaying a displaying item that imitates a ripple so as to be superimposed on the displaying object and of moving the displaying item in a direction identical to a direction of scrolling by the instructing operation in a case where the instructing operation is not completed even if the displaying object has been scrolled to an end of a scrolling range,
  wherein the displaying item is a pattern including arcs that are convex in a direction of the scrolling.

20. A display control apparatus comprising:
  a display unit configured to display a displaying object;
  an operation detection unit configured to detect a user's operation to said display unit; and
  a display control unit configured to scroll the displaying object in a case where said operation detection unit detects an instructing operation of scrolling, to display a displaying item that imitates a ripple so as to be superimposed on the displaying object and to move the displaying item in a direction identical to a direction of scrolling by the instructing operation in a case where the instructing operation is not completed even if the displaying object has been scrolled to an end of a scrolling range,
  wherein said display control unit moves the displaying item according to a movement of a point at which the instructing operation is given on said display unit in the same direction as the movement, and
  wherein said display control unit moves the displaying item at a speed higher than a movement speed of the point at which the instructing operation is given on said display unit.

21. The display control apparatus according to claim 20, wherein said display control unit displays the displaying item so as to be superimposed on a displaying object that is displayed at a point at which the instructing operation is given on said display unit in a case where a plurality of displaying objects are displayed on said display unit.

22. The display control apparatus according to claim 20, wherein said display control unit disappears the displaying item in a case where said operation detection unit no longer detects the instructing operation.

23. A control method for a display control apparatus that displays a displaying object on a display unit, the control method comprising:

a detection step of detecting a user's operation to said display unit; and a first control step of scrolling the displaying object in a case where an instructing operation of scrolling is detected in said detection step, and a second control step of displaying a displaying item that imitates a ripple so as to be superimposed on the displaying object and of moving the displaying item in a direction identical to a direction of scrolling by the instructing operation in a case where the instructing operation is not completed even if the displaying object has been scrolled to an end of a scrolling range, wherein the second control step further comprises:

moving the displaying item according to a movement of a point at which the instructing operation is given on said display unit in the same direction as the movement, and moving the displaying item at a speed higher than a movement speed of the point at which the instructing operation is given on said display unit.

24. A non-transitory computer-readable storage medium storing a control program causing a computer to execute a control method for a display control apparatus that displays a displaying object on a display unit, the control method comprising:

a detection step of detecting a user's operation to said display unit; and a first control step of scrolling the displaying object in a case where an instructing operation of scrolling is detected in said detection step, and a second control step of displaying a displaying item that imitates a ripple so as to be superimposed on the displaying object and moving the displaying item in a direction identical to a direction of scrolling by the instructing operation in a case where the instructing operation is not completed even if the displaying object has been scrolled to an end of a scrolling range, wherein the second control step further comprises:

moving the displaying item according to a movement of a point at which the instructing operation is given on said display unit in the same direction as the movement, and moving the displaying item at a speed higher than a movement speed of the point at which the instructing operation is given on said display unit.

* * * * *